US012145115B2

(12) United States Patent
Oh et al.

(10) Patent No.: US 12,145,115 B2
(45) Date of Patent: Nov. 19, 2024

(54) FLUID PROCESSING APPARATUS AND METHOD OF CONTROLLING THE SAME

(71) Applicant: AMOREPACIFIC CORPORATION, Seoul (KR)

(72) Inventors: Soojung Oh, Yongin-si (KR); Jin Nam, Yongin-si (KR); Jeongin Lee, Yongin-si (KR)

(73) Assignee: Amorepacific Corporation, Seoul (KR)

( * ) Notice: Subject to any disclaimer, the term of this patent is extended or adjusted under 35 U.S.C. 154(b) by 290 days.

(21) Appl. No.: 17/568,333

(22) Filed: Jan. 4, 2022

(65) Prior Publication Data

US 2022/0212153 A1 Jul. 7, 2022

(30) Foreign Application Priority Data

Jan. 7, 2021 (KR) ........................ 10-2021-0002012

(51) Int. Cl.

*B01F 23/45* (2022.01)
*A45D 34/00* (2006.01)
*B01F 25/00* (2022.01)
*B01F 33/84* (2022.01)
*B01F 35/71* (2022.01)
*B01F 101/21* (2022.01)

(52) U.S. Cl.

CPC ............ *B01F 23/452* (2022.01); *A45D 34/00* (2013.01); *B01F 25/105* (2022.01); *B01F 33/84* (2022.01); *B01F 35/7176* (2022.01); *A45D 2200/058* (2013.01); *B01F 2101/21* (2022.01)

(58) Field of Classification Search

CPC ...... B01F 23/452; B01F 33/84; B01F 25/105; B01F 35/7176

See application file for complete search history.

(56) References Cited

U.S. PATENT DOCUMENTS 6,637,471 B2 * 10/2003 Luehrsen ............ B01F 35/2218 222/145.5
6,672,341 B2 1/2004 Bartholomew et al.
7,111,652 B2 * 9/2006 Koide ............... B01F 25/31323 141/94
8,313,711 B2 * 11/2012 Brown .................... B01F 33/84 366/181.8
8,830,467 B2 * 9/2014 Igarashi .................. B01F 33/84 356/402

(Continued)

FOREIGN PATENT DOCUMENTS

KR 10-1317425 B1 10/2013
KR 10-1741575 B1 5/2017
WO 2016057294 A1 4/2016

*Primary Examiner* — Timothy L Maust

(74) *Attorney, Agent, or Firm* — Sughrue Mion, PLLC

(57) ABSTRACT

According to an aspect of this disclosure, there is provided a fluid processing apparatus including: a housing with a space formed therein; a fluid receiving part removably coupled to the housing and receiving a fluid therein; and a conveying part accommodated in the space of the housing and coupled to the fluid receiving part to be in fluid communication therewith, wherein the conveying part includes: a pump member coupled to the fluid receiving part and providing a conveying force to the fluid; and a mixing nozzle which is in communication with the pump member, and into which the fluid flows after having passed through the pump member.

4 Claims, 22 Drawing Sheets

(56) References Cited

U.S. PATENT DOCUMENTS

| | | | | |
|---|---|---|---|---|
| 10,532,335 | B1 | 1/2020 | Chan et al. | |
| 11,944,702 | B2 * | 4/2024 | Lu | G16H 20/13 |
| 2005/0087562 | A1 | 4/2005 | Koide et al. | |
| 2016/0052007 | A1 * | 2/2016 | Fuller | A47K 5/1217<br>222/638 |
| 2016/0107133 | A1 | 4/2016 | Sugino et al. | |

* cited by examiner

FLUID PROCESSING APPARATUS AND METHOD OF CONTROLLING THE SAME

CROSS-REFERENCE TO RELATED APPLICATION(S)

This application is based on and claims priority of Korean Patent Applications No 10-2021-0002012 filed on Jan. 7, 2021 with the Korean Intellectual Property Office, the entire content of which is hereby incorporated by reference.

TECHNICAL FIELD

This disclosure relates to a fluid processing apparatus and method of controlling the same, and more particularly, to a fluid processing apparatus configured to allow a user to easily mix various fluids in a desired ratio, and easily heat or cool a fluid to be used to an appropriate temperature, and a method of controlling the same.

BACKGROUND

The term “cosmetics,” “cosmetic product,” or “cosmetic composition” is one that collectively refers to creams, powders, perfumes, etc. used by users for makeup or caring skin, hair, eyelash, and/or eyebrows. Conventionally, cosmetics have been used for the purpose of making user’s appearance more beautiful, but recently, they are used not only for the appearance itself but also for health purposes such as skin care.

Most cosmetics on the market are assumed to be used individually. In general, each cosmetic product is manufactured with different ingredients, and a user selects and uses a cosmetic product according to a desired effect.

As the trend of our society changes toward reflecting personal needs, the cosmetic product market also begins to follow this trend. That is, an increasing number of users not only purchase and use a single cosmetic product that has already been manufactured, but also mix a plurality of cosmetic products to manufacture their own cosmetic product by themselves.

Conventionally, various cosmetics in the form of finished products are put into a plurality of cartridges of a cosmetic mixing apparatus, respectively, and a user pumps the device to make it discharge each cosmetic product as much as the user wants. The discharged cosmetic products are mixed directly by the seller or customers and provided to the customers.

However, this type of cosmetic mixing apparatus has various drawbacks.

First, they are concerned with the method of discharging a cosmetic product. When the cosmetic product is discharged by the pumping method, there is a concern that the residual cosmetic product remains in the cartridge and the pumping apparatus. Considering that cosmetics are compounds that can be contaminated with changes in the surrounding environment, this problem may affect the freshness of the cosmetic product Also, the drawbacks are concerned with the way in which cosmetics are mixed. The various types of cosmetic products discharged by the pumping method are mixed by the seller or customer, who, during this process, uses hands or tools. In addition to the problem of cleanliness management of tools, there is also the possibility that the cosmetic product may be contaminated by bacteria, etc. when the cosmetic product is mixed by hand.

Furthermore, there is also a problem that it is difficult to diversify the effects of the mixed cosmetic product. That is, there is a limit to the types of cosmetic products that can be discharged and provided by a pumping method. Therefore, it is difficult to diversify the effect that can be provided to the user by mixing, and thus it is difficult to accurately reflect the user’s needs.

Accordingly, various techniques for effectively mixing cosmetic products and providing the resultant cosmetic product to customers have been introduced.

Korean Patent No. 10-1741575B1 discloses a cosmetic mixing apparatus capable of adjusting the mixing ratio. Specifically, it discloses a cosmetic mixing apparatus having a structure in which a plurality of cartridges loaded with a plurality of liquid cosmetic products, respectively are pressed with a push bar to discharge the cosmetic products, and the discharged cosmetics are mixed in a mixing device. The prior document discloses the effect of adjusting the proportion of cosmetic products according to the degree of pressurization of the push bar provided in the cartridge.

However, the cosmetic mixing apparatus having such a structure has a drawback that the discharge rate of cosmetic products must be adjusted by the user. That is, since the discharged amount of cosmetic product is adjusted according to the force with which the user presses on the push bar, there is high possibility that cosmetic product of an unwanted proportion may be manufactured by the user’s erroneous operation.

Korean Patent No. 10-1317425B1 discloses a disposable cosmetic mixing container. Specifically, it discloses a cosmetic mixing container for one time use that has a structure in which by mounting an ampoule containing a certain amount of raw material into the ampoule insertion port provided in the main body, different kinds of raw materials can be discharged into the inner space of the main body and be mixed therein.

However, the cosmetic mixing container of this structure has a drawback that the ampoule containing the cosmetic product must be repurchased every time. That is, the ampoule disclosed in the prior document is pre-manufactured and sold by the manufacturer, and thus there is a concern that the variety of cosmetic products that can be manufactured by a user may be reduced. Additionally, the cosmetic mixing container disclosed in the prior document is in a form in which the upper side thereof to which the ampoule is coupled is always open, and it is difficult to exclude the possibility that foreign substances such as dust are introduced thereinto.

Furthermore, in the case of the prior document, there is also a drawback that a user can no longer use it when the structure of the product is changed due to the situations of the manufacturer.

SUMMARY

An object of this disclosure is to provide a fluid processing apparatus having a structure capable of addressing the above-described drawbacks, and a method of controlling the same.

First, an object of this disclosure is to provide a fluid processing apparatus having a structure capable of easily processing a fluid, and a method of controlling the same.

Another object of this disclosure is to provide a fluid processing apparatus having a structure capable of accurately processing a fluid according to demand, and a method of controlling the same.

Additionally, still another object of this disclosure is to provide a fluid processing apparatus having a structure capable of sanitarily processing a fluid, and a method of controlling the same.

Additionally, still another object of this disclosure is to provide a fluid processing apparatus having a structure capable of processing a fluid in various forms, and a method of controlling the same.

According to an aspect of the present invention, there is provided a fluid processing apparatus comprising: a housing with a space formed therein; a fluid receiving part removably coupled to the housing and receiving a fluid therein; and a conveying part accommodated in the space of the housing and coupled to the fluid receiving part to be in fluid communication therewith, wherein the conveying part includes: a pump member coupled to the fluid receiving part and providing a conveying force to the fluid; and a mixing nozzle which is in communication with the pump member, and into which the fluid flows after having passed through the pump member.

Further, there is provided a fluid processing apparatus, wherein the fluid includes a plurality of fluids of different kinds, and wherein the fluid receiving part includes: a main container for receiving any one fluid of the plurality of fluids; and a sub-container that receives another fluid of the plurality of fluids and is formed to have a smaller volume than that of the main container.

Further, there is provided a fluid processing apparatus, wherein the pump member includes: a main pump member coupled to the main container to apply a conveying force to said any one fluid; and a sub-pump member coupled to the sub-container to apply a conveying force to said another fluid.

Further, there is provided a fluid processing apparatus, wherein the sub-container includes a plurality of sub-containers which receive the plurality of fluids except said any one fluid, respectively, and wherein the sub-pump member includes a plurality of sub-pump members which are coupled to the plurality of sub-containers, respectively.

Further, there is provided a fluid processing apparatus, wherein the fluid receiving part includes: a plurality of containers receiving different fluids, and wherein the pump member includes a plurality of pump members which are coupled to the plurality of containers, respectively to be in fluid communication therewith.

Further, there is provided a fluid processing apparatus, wherein the fluid includes: a main fluid; and a plurality of sub-fluids provided in a smaller volume compared to the main fluid, and wherein the fluid receiving part includes: a main container receiving the main fluid, and coupled to any one pump member of the plurality of pump members to be in fluid communication therewith; and a plurality of sub-containers receiving the plurality of sub-fluids, respectively, and coupled to the plurality of pump members except said any one pump member, respectively to be in fluid communication therewith.

Further, there is provided a fluid processing apparatus, wherein the mixing nozzle includes: an inlet which communicates with each of the plurality of pump members, and through which the fluid is introduced; and a single outlet communicating with the inlet and discharging the introduced fluid.

Further, there is provided a fluid processing apparatus, further comprising a tray which is located below the mixing nozzle, and in which the fluid discharged through the outlet is collected, wherein the tray is provided to be withdrawable to the outside of the housing.

Further, there is provided a fluid processing apparatus, wherein the housing includes: a tray that is withdrawably accommodated in the space, is located below the conveying part, and collects the fluid that has passed through the mixing nozzle.

Further, there is provided a fluid processing apparatus, further comprising: a temperature control member accommodated in the space of the housing and located adjacent to the tray to heat or cool the fluid collected in the tray.

Further, there is provided a fluid processing apparatus, wherein the temperature control member is provided with a thermoelectric element.

According to another aspect of the present invention, there is provided a method of controlling a fluid processing apparatus, the method comprising: (a) receiving a fluid in a fluid receiving part; (b) coupling the fluid receiving part to a housing; (c) coupling the fluid receiving part with a conveying part; (d) receiving a control signal inputted in a current carrying part; and (e) processing the fluid by operating at least one of the conveying part and the current carrying part according to the inputted control signal.

Further, there is provided a method of controlling a fluid processing apparatus, wherein the step (a) includes: (a1) receiving a main fluid in a main container; and (a2) receiving a sub-fluid in a sub-container.

Further, there is provided a method of controlling a fluid processing apparatus, wherein the step (b) includes: (b1) penetratingly coupling the main container to a support frame of the housing; (b2) inserting and coupling the main container to a coupling frame of the housing; (b3) penetratingly coupling a sub-container to the support frame of the housing; and (b4) inserting and coupling the sub-container to the coupling frame of the housing.

Further, there is provided a method of controlling a fluid processing apparatus, wherein the step (c) includes: (c1) coupling a valve member and a pump member of the conveying part with each other; and (c2) coupling the fluid receiving part and the valve member with each other.

Further, there is provided a method of controlling a fluid processing apparatus, wherein the step (c1) includes: (c11) coupling a main pump member and a main valve member with each other; and (c12) coupling a sub-pump member and a sub-valve member with each other, and wherein the step (c2) includes: (c21) coupling a main container and the main valve member with each other; and (c22) coupling a sub-container and the sub-valve member with each other.

Further, there is provided a method of controlling a fluid processing apparatus, wherein the step (d) includes: (d1) electrically connecting a power terminal of the current carrying part to an external power source; and (d2) receiving a control signal in an inputted printed circuit board (PCB) of the current carrying part.

Further, there is provided a method of controlling a fluid processing apparatus, wherein the step (e) includes: (e11) operating a main pump member of the conveying part according to the inputted control signal, so that a main fluid flows toward a mixing nozzle of the conveying part; (e12) operating a sub-pump member of the conveying part according to the inputted control signal, so that a sub-fluid flows toward the mixing nozzle; and (e13) passing the flowing main fluid and the flowing sub-fluid through the mixing nozzle, so that they are mixed with each other and flow toward a tray of the housing.

Further, there is provided a method of controlling a fluid processing apparatus, wherein the step (e) includes: (e21) operating at least one of a main pump member and a sub-pump member of the conveying part according to the inputted control signal, so that at least one of a main fluid and a sub-fluid flows toward a mixing nozzle; (e22) passing at least one of the flowing main fluid and the flowing sub-fluid through the mixing nozzle, so that they are mixed with each other and flow toward a tray of the housing; (e23) controlling a temperature control member according to the inputted control signal; and (e24) heating or cooling at least one of the main fluid and the sub-fluid received in the tray.

Further, there is provided a method of controlling a fluid processing apparatus, wherein the step (e) includes: (e31) operating a main pump member of the conveying part according to the inputted control signal, so that a main fluid flows toward a mixing nozzle; (e32) operating a sub-pump member of the conveying part according to the inputted control signal, so that a sub-fluid flows toward the mixing nozzle; (e33) passing the flowing main fluid and the flowing sub-fluid through the mixing nozzle, so that they are mixed with each other and flow toward a tray; (e34) operating a temperature control member according to the inputted control signal; and (e35) heating or cooling a mixed fluid received in the tray.

According to the fluid processing apparatus and the control method thereof of this disclosure, the following effects can be achieved.

First, the fluid processing apparatus is provided with a fluid receiving part for receiving various fluids. The fluid receiving part includes a main container receiving a main fluid and a sub-container receiving a sub-fluid.

The fluid receiving part is removably coupled to a housing. The fluid receiving part coupled to the housing is connected to a conveying part accommodated in the housing to be in fluid communication therewith. It is operated according to a control signal applied by a user so that the main fluid and the sub-fluid received in the fluid receiving part can flow selectively.

Accordingly, the user can easily process a fluid of a desired content without manually discharging each of various fluids.

In addition, the conveying part is operated by a control signal applied by a user, and an external power source. A plurality of pump members included in the conveying part may be selectively operated according to an applied control signal. Accordingly, the operation start time, operation speed and operation stop time of the plurality of pumps can be precisely controlled.

The plurality of pump members are respectively connected to the plurality of containers included in the fluid receiving part to be in fluid communication therewith. Each of the fluids received in the plurality of containers may flow independently of each other as the plurality of pump members are operated. At this time, the flow rate of each flowing fluid may be precisely adjusted by the pump member operated according to the applied control signal.

Accordingly, it is possible to accurately process the fluid according to the user's needs, compared to the case where the user processes the fluid depending on the manual operation.

Additionally, the above-described process is performed in a state in which the user does not directly contact the fluid under being processed. Furthermore, after the fluid processing process is performed and before the next fluid processing process is performed, the main pump member may be operated to wash the residual sub-fluid by making the main fluid flow through the conveying part.

Accordingly, each process is performed without user's contact, and the fluid used in the previous fluid processing process can be washed in the present fluid processing process. As a result, the hygiene of the fluid processing process can be improved.

In addition, the conveying part applies a conveying force to each of the plurality of fluids independently, so that the content of the target fluid to be mixed is adjusted. Further, a temperature control member is provided in a current carrying part to adjust the temperature of the main fluid, the sub-fluid, or a mixed fluid in which the main fluid and the sub-fluid are mixed.

Accordingly, the fluid may be processed in various forms according to the user's demand, and thus the user's convenience may be improved.

DETAILED DESCRIPTION

Hereinafter, a fluid processing apparatus 10 and a control method thereof according to an embodiment of this disclosure will be described in detail with reference to the accompanying drawings. In the following description, in order to clarify the characteristics of this disclosure, descriptions of some components may be omitted.

1. Definition of Terms

Further, when one element is referred to as being "connected" or "accessed" to another element, it can be directly connected or accessed to the other element or intervening elements may also be present as would be understood by one of skill in the art. On the contrary, when one element is referred to as being "directly connected" or "directly accessed" to another element, it should be understood as that no other element is present between them.

As used herein, the singular forms may include the plural forms unless the context clearly indicates otherwise.

As used in the following description, the term "communication" means that one or more members are fluidly connected to each other. In an embodiment, the fluid may be a gas or a liquid.

As used in the following description, the term "fluid" means a liquid matter or gaseous matter in any form that can be applied or scattered on the skin of an animal or human being. In an embodiment, the fluid may be a liquid phase or gel type cosmetic product. Also, in the present specification, the fluid may include a powder form cosmetic product.

The term "main fluid" used in the following description refers to a fluid which serves as a solvent when a plurality of different fluids are mixed. The inputted amount of the main fluid may be greater than that of another fluid. In an embodiment in which the fluid is provided as a cosmetic product, the main fluid may be provided as a main cosmetic product or a base cosmetic product.

The term "sub-fluid" used in the following description refers to a fluid which serves as a solute when a plurality of different fluids are mixed. The inputted amount of the sub-fluid may be less than that of the main fluid. In an embodiment in which the fluid is provided as a cosmetic product, the sub-fluid may be provided as a sub-cosmetic product, or sub-cosmetic product having different functionalities.

As used in the following description, the term "processing" means any form of process of processing a fluid. In one embodiment, "processing" may include processes related to heating, cooling, mixing, injecting and discharging a fluid, and the like.

Figure 5:
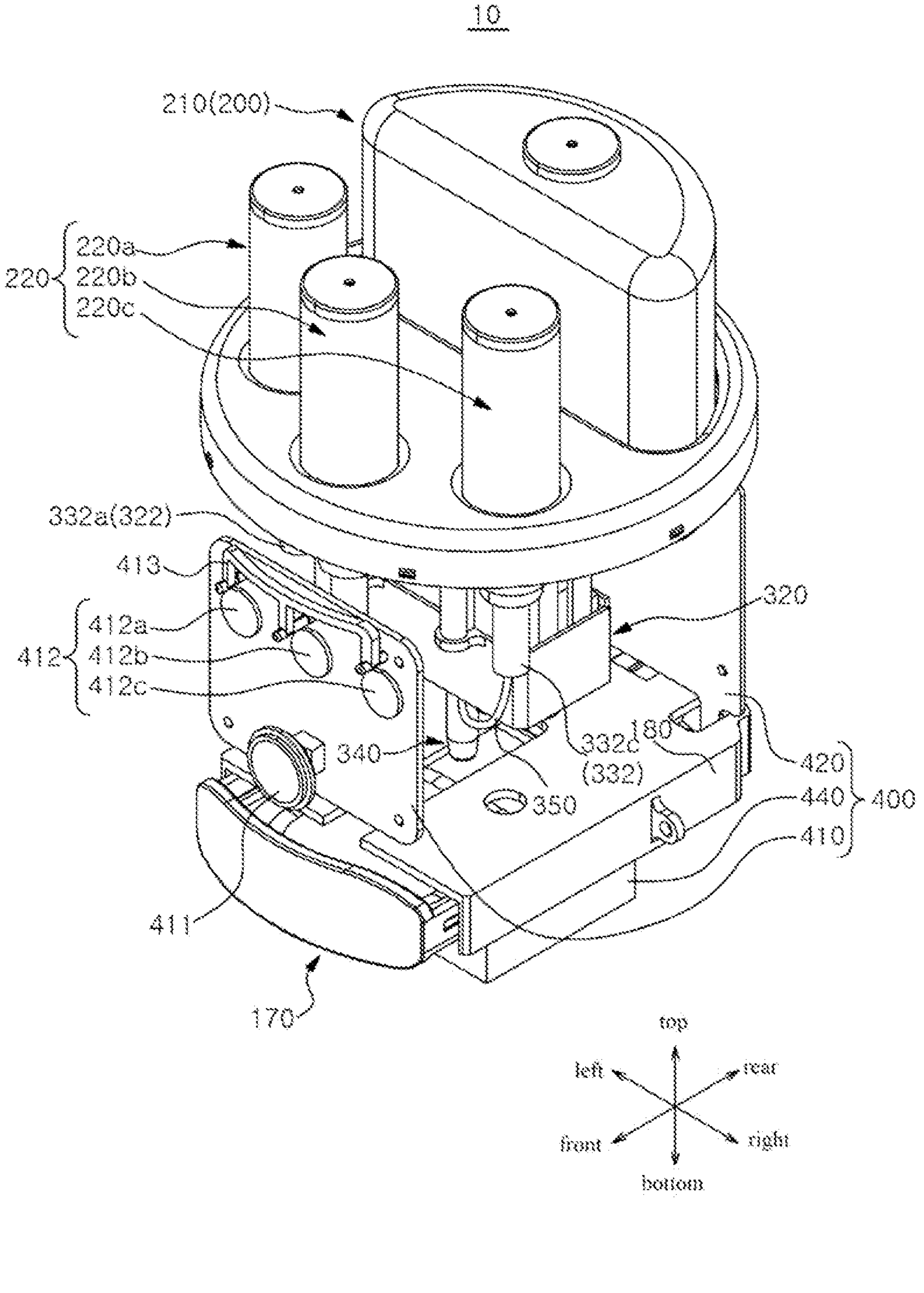
FIG. 5 is a partial perspective view showing an internal configuration of the fluid processing apparatus of FIG. 1.
Figure 6:
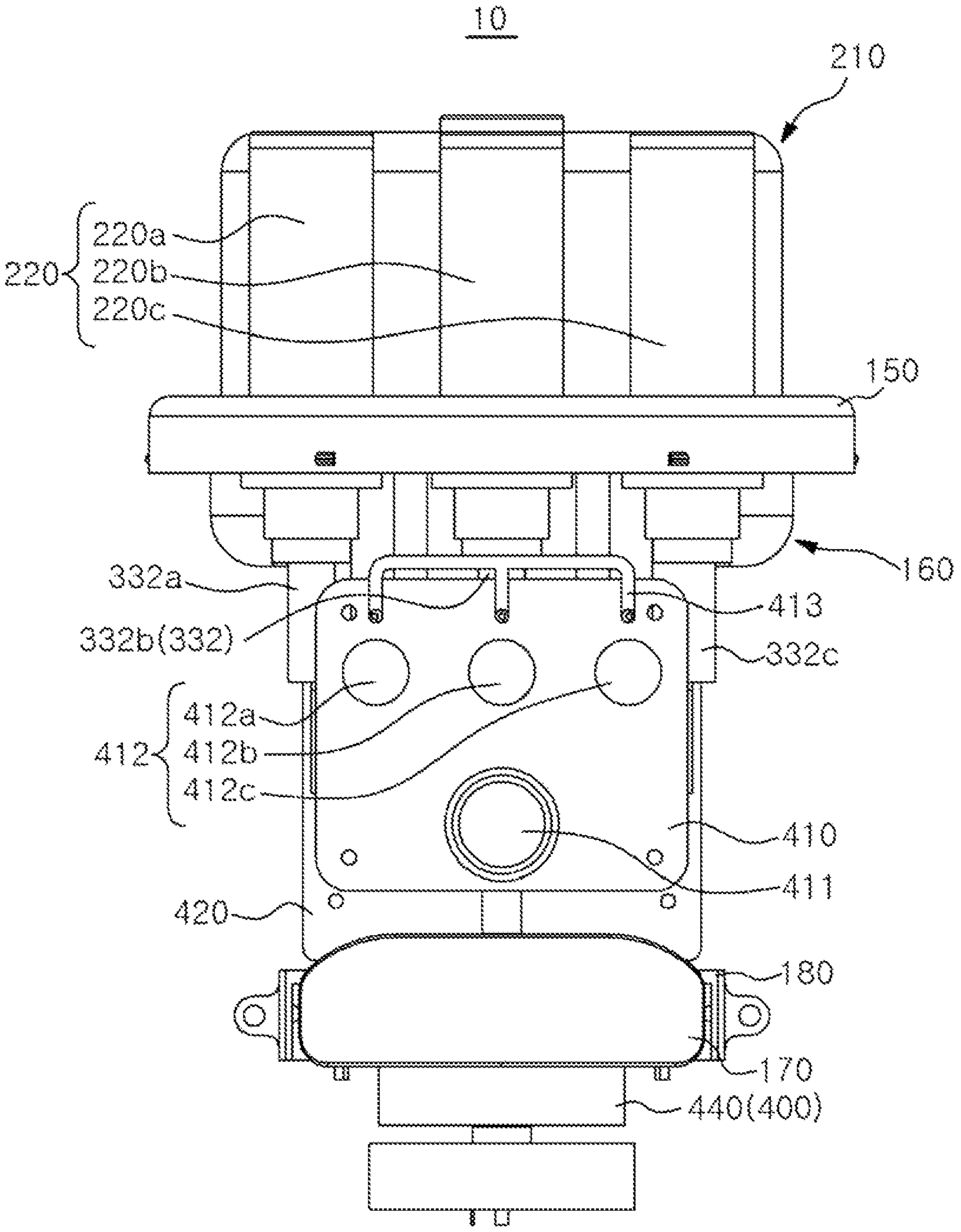
FIG. 6 is a partial front view showing the internal configuration of the fluid processing apparatus of FIG. 1.
Figure 7:
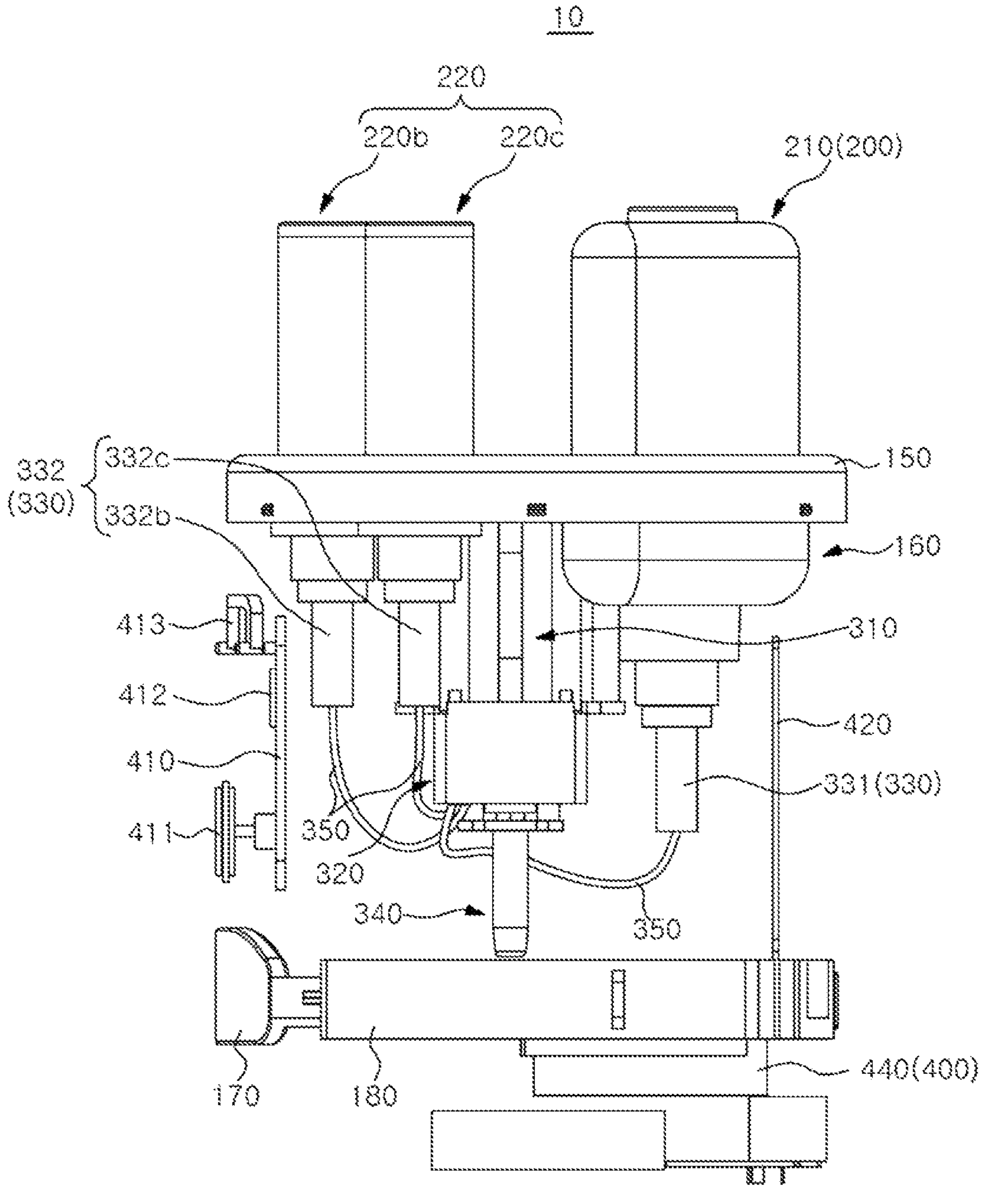
FIG. 7 is a partial side view showing the internal configuration of the fluid processing apparatus of FIG. 1.
Figure 8:
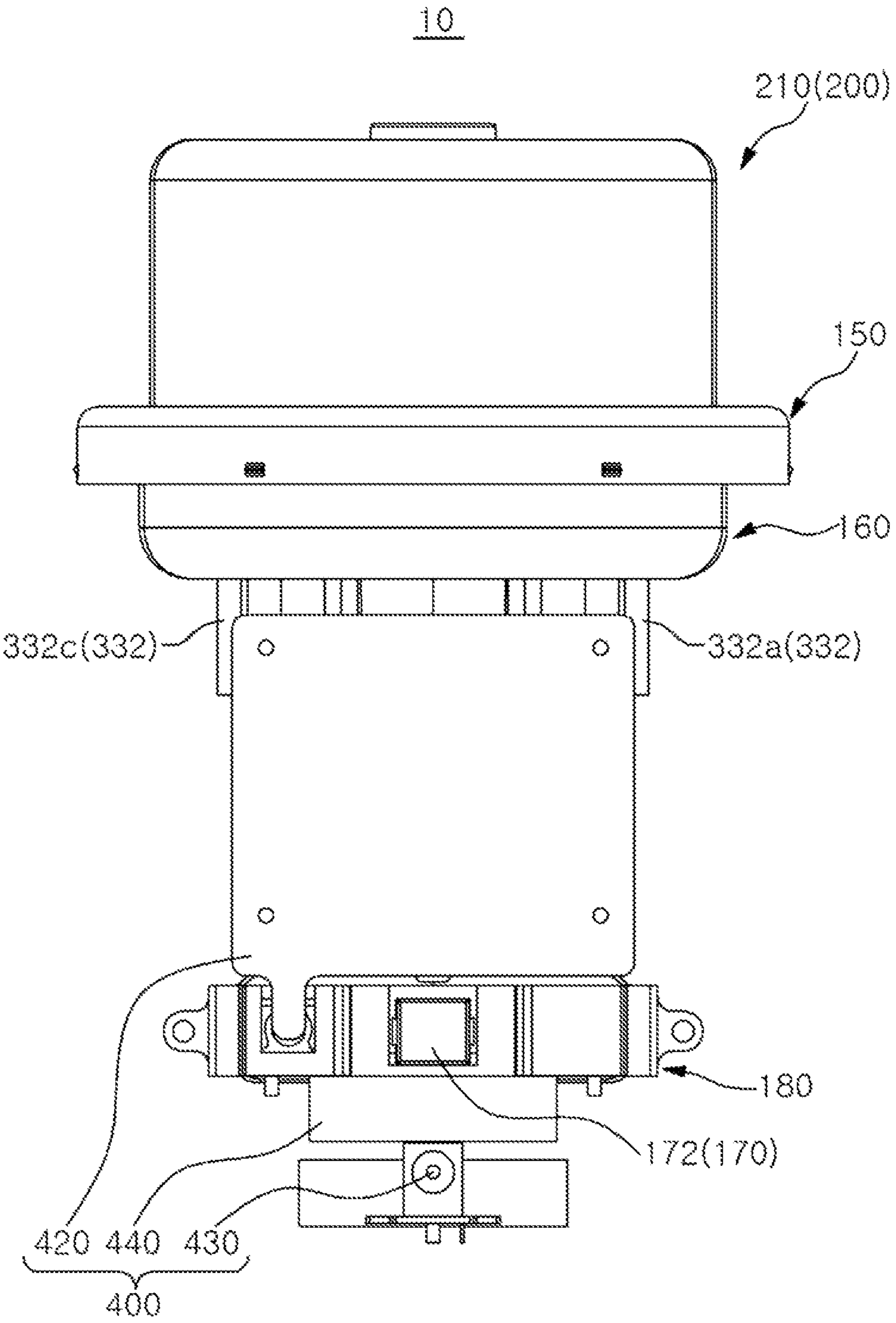
FIG. 8 is a partial rear view showing the internal configuration of the fluid processing apparatus of FIG. 1.

The terms "top", "bottom", "front side", "rear side", "left" and "right" used in the following description will be understood with reference to the coordinate system shown in FIGS. 1 and 5.

2. Description of a Fluid Processing Apparatus 10 According to an Embodiment of this Disclosure The fluid processing apparatus 10 may process various kinds of fluids selected by a user. In an embodiment, the fluid processing apparatus 10 may mix, heat, cool, inject, and discharge the various kinds of fluids.

The fluid processing apparatus 10 is electrically connected to an external power source (not shown). Power required to operate the fluid processing apparatus 10 may be delivered from the external power source (not shown). The connection may be formed by, for example, a conductive wire member (not shown).

The fluid processing apparatus 10 according to an embodiment of this disclosure may process various fluids in various forms according to user's needs. In addition, the user may easily perceive the remaining amount of the fluids supplied to the fluid processing apparatus 10.

Furthermore, the process of processing the fluid by the fluid processing apparatus 10 may be performed without involving any manual operation of a user. Accordingly, not only the hygiene and reliability of the fluid processing operation can be improved, but also the user's convenience can be improved.

Figure 1:
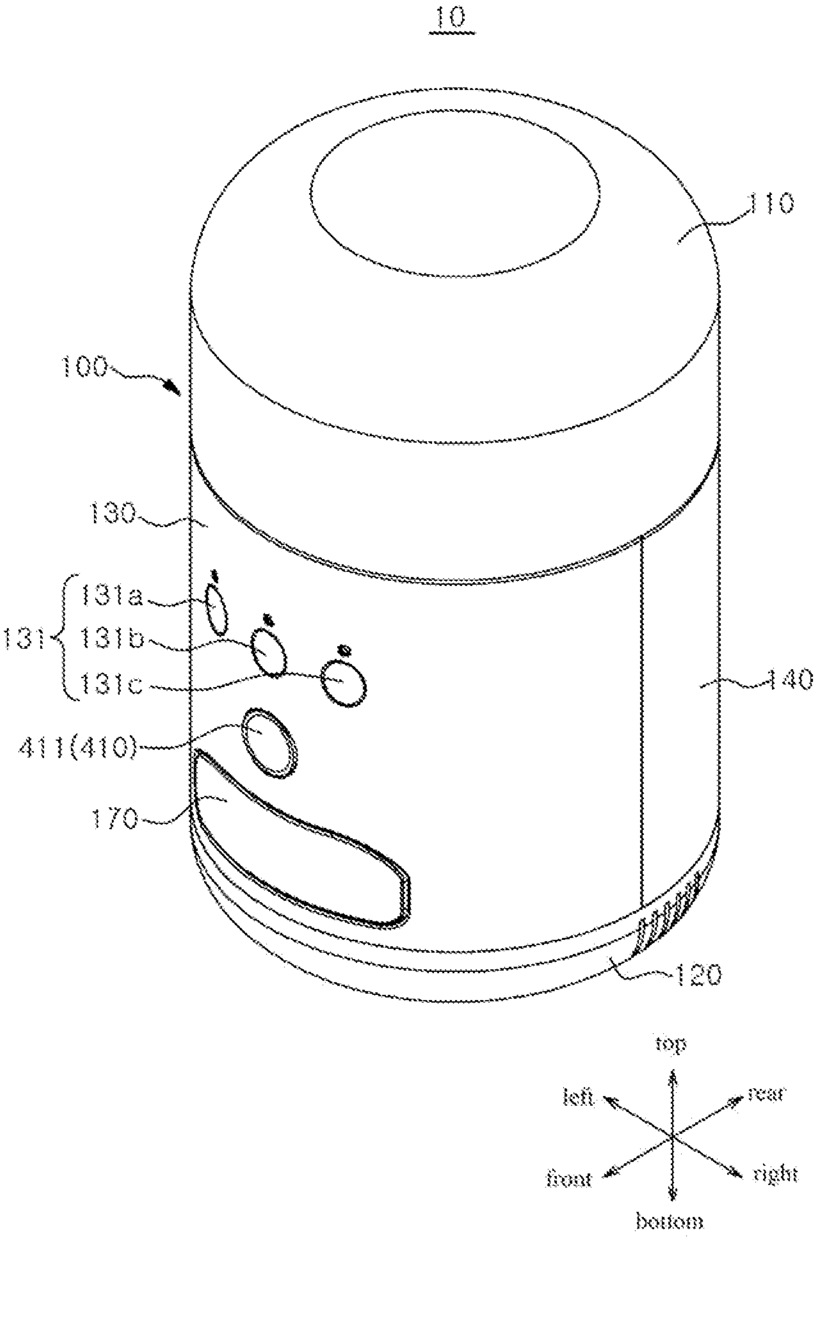
FIG. 1 is a perspective view illustrating a fluid processing apparatus according to an embodiment of this disclosure.
Figure 2:
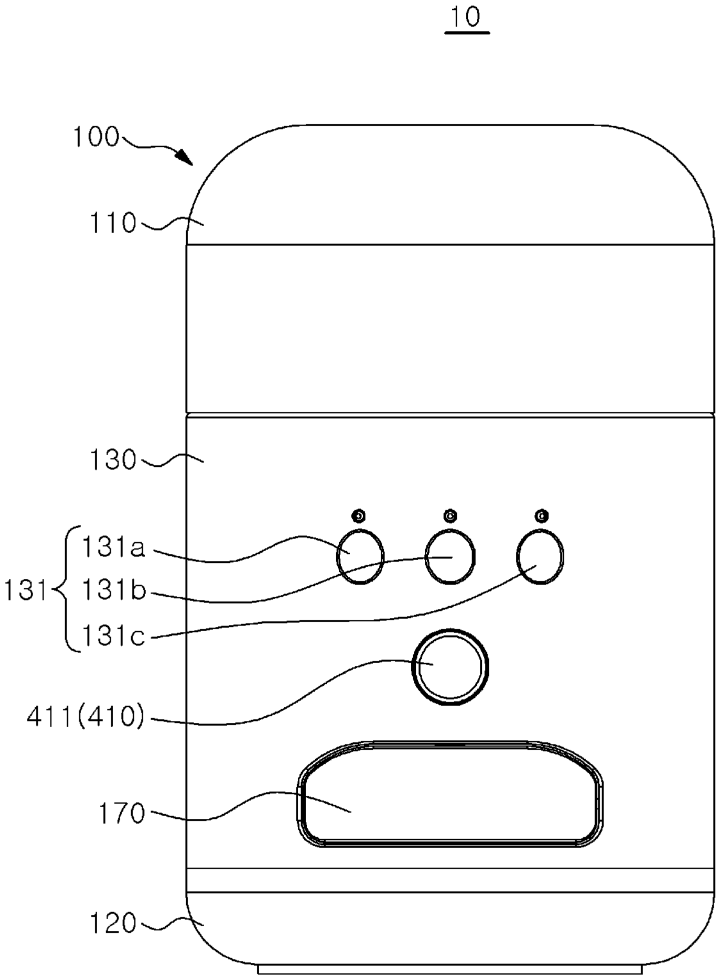
FIG. 2 is a front view illustrating the fluid processing apparatus of FIG. 1.
Figure 3:
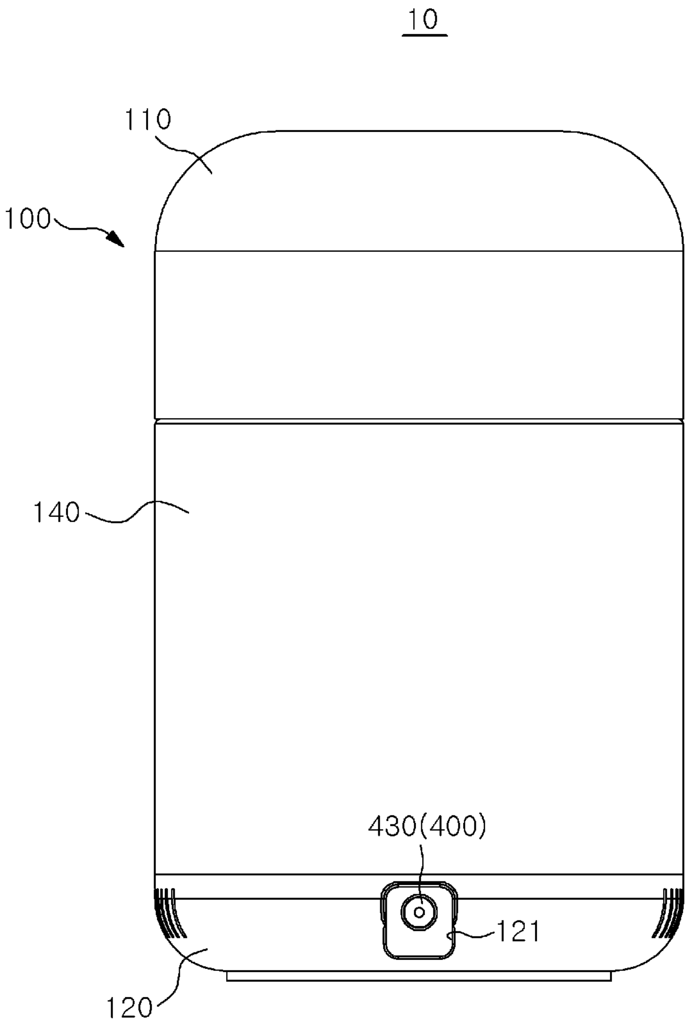
FIG. 3 is a rear view illustrating the fluid processing apparatus of FIG. 1.
Figure 4:
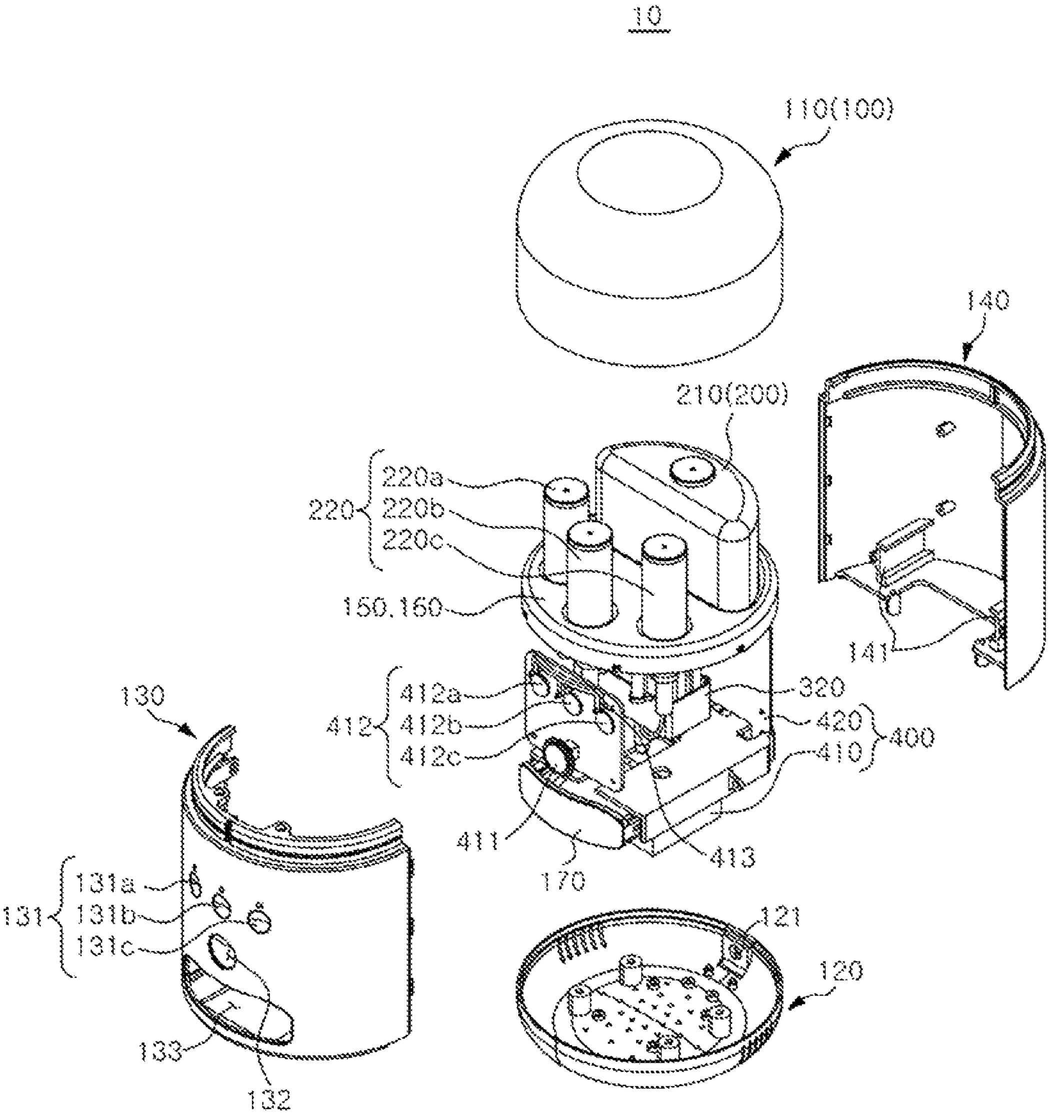
FIG. 4 is an exploded perspective view illustrating the fluid processing apparatus of FIG. 1.

FIGS. 1 to 3 show a fluid processing apparatus 10 according to an embodiment of this disclosure. In the shown embodiment, the fluid processing apparatus 10 includes a housing 100 that is exposed to the outside thereof.

Additionally, with further reference to FIGS. 4 to 14, the fluid processing apparatus 10 according to the shown embodiment includes a fluid receiving part 200, a conveying part 300, and a current carrying part 400.

(1) Description of the Housing 100

Referring to FIGS. 1 to 14, the fluid processing apparatus 10 according to the shown embodiment includes the housing 100.

The housing 100 forms the external appearance of the fluid processing apparatus 10. A space is formed inside the housing 100, so that various components for functions of the fluid processing apparatus 10 may be mounted therein. In an embodiment, the fluid receiving part 200, the conveying part 300, and the current carrying part 400, which will be described later, may be mounted inside the housing 100.

The space formed inside the housing 100 may be electrically connected to an external power source (not shown). Various components accommodated in the housing 100 may be operated by receiving power from the external power source (not shown).

In the shown embodiment, the housing 100 includes a top cover 110, a bottom cover 120, a front cover 130, a rear cover 140, a support frame 150, a coupling frame 160, a tray 170, and a guide frame 180.

The top cover 110 forms one side of the housing 100, i.e., a top side in the shown embodiment.

A space is formed inside the top cover 110. The fluid receiving part 200 may be accommodated in that space. That is, the top cover 110 covers the fluid receiving part 200 accommodated in the space from the top side.

The top cover 110 may be formed of a transparent material. As will be described later, the fluid receiving part 200 for receiving fluids is removably accommodated in the space. As the top cover 110 is formed of a transparent material, the user can easily recognize the amount of fluid received in the fluid receiving part 200 without removing the top cover 110.

The top cover 110 is provided removably. Specifically, the top cover 110 is removably coupled to the support frame 150. In the shown embodiment, the lower inner periphery of the top cover 110 is removably coupled to the support frame 150.

At this time, since the front cover 130 and the rear cover 140 are also removably coupled to the support frame 150, it may be said that the top cover 110 is removably coupled to the front cover 130 and the rear cover 140.

The top cover 110 may have a space formed therein and capable of accommodating the fluid receiving part 200 therein, and may have any shape that enables it to be removably coupled to the support frame 150. In the shown embodiment, the top cover 110 is formed in a dome shape rounded convexly upwards.

The top cover 110 is disposed opposite the bottom cover 120 with the front cover 130 and the rear cover 140 interposed therebetween.

The bottom cover 120 forms the other side of the housing 100, such as, the lower side in the shown embodiment.

A space is formed inside the bottom cover 120. The space communicates with the spaces formed inside the front cover 130 and the rear cover 140, respectively. A temperature control member 440 of the current carrying part 400 is accommodated in the space. That is, the bottom cover 120 covers the temperature control member 440 accommodated in the space from the lower side.

Additionally, in the space of the bottom cover 120, a part of an output PCB 420 of the current carrying part 400 and a power terminal part 430 connected thereto are accommodated.

The bottom cover 120 is provided removably. Specifically, the bottom cover 120 is removably coupled to the front cover 130 and the rear cover 140. Additionally, the bottom cover 120 is also removably coupled to a guide frame 180.

The bottom cover 120 may form therein a space capable of accommodating the current carrying part 400 therein, and may have any shape which enables it to be removably coupled to the front cover 130, the rear cover 140, and the guide frame 180. In the shown embodiment, the bottom cover 120 is formed in a dome shape rounded convexly downwards.

In the shown embodiment, the bottom cover 120 includes a power opening 121.

The power opening 121 is a passage through which the space formed inside the bottom cover 120 is electrically connected to an external power source (not shown). Specifically, the power terminal part 430 is electrically connected to an external power source (not shown) through the power opening 121 provided in the bottom cover 120. Accordingly, each component of the current carrying part 400 may be electrically connected to an external power source (not shown).

The front cover 130 and the rear cover 140 are located between the bottom cover 120 and the top cover 110.

The front cover 130 forms another side of the housing 100, i.e., the front side in the shown embodiment.

A space is formed inside the front cover 130. The space communicates with the spaces formed inside the bottom cover 120 and the rear cover 140, respectively. The support frame 150, the coupling frame 160, the tray 170, the guide frame 180, the conveying part 300, and the current carrying part 400 are accommodated in that space.

The front cover 130 is provided removably. Specifically, the front cover 130 is removably coupled to the bottom cover 120, the rear cover 140, the support frame 150, and the coupling frame 160.

The front cover 130 may form therein a space capable of accommodating the components, and may have any shape which enables it to be removably coupled to the bottom cover 120, the rear cover 140, the support frame 150, the coupling frame 160, and the like. In the shown embodiment, the front cover 130 has a rounded arc shape with a predetermined curvature so as to be convex toward the front side. That is, in the shown embodiment, the upper, lower and rear sides of the front cover 130 are formed to be open.

In the shown embodiment, the front cover 130 includes a selection button 131, a button opening 132, and a withdrawal opening 133.

The selection button 131 is manipulated by a user, so that the fluid processing apparatus 10 receives a control signal for processing a fluid. The selection button 131 is exposed to the outside of the fluid processing apparatus 10, and thus can be easily manipulated by a user.

The selection button 131 may be provided in any form that enables it to receive a control signal by the manipulation of a user. In the shown embodiment, the selection button 131 is provided in the form of a touch pad which receives a control signal applied when it is touched. Alternatively, the selection button 131 may be provided in the form of a toggle button that is pressed to receive a control signal, or of a dial button which receives a control signal applied when it is rotated.

The selection button 131 is electrically connected to an inputted PCB 410 of the current carrying part 400. Specifically, the selection button 131 may be electrically connected to a sub-button 412 of the inputted PCB 410, so that, when the selection button 131 is manipulated, the sub-button 412 can be manipulated. Accordingly, the current carrying part 400 may be operated by the manipulation of the selection button 131.

In an embodiment, the selection button 131 may be recessed from the outer surface of the front cover 130. In the above embodiment, the user can easily recognize that the selection button 131 is provided at a position that the user is in contact with, and manipulate the selection button 131 to apply a control signal.

A shape representing a control signal to be applied when the corresponding selection button 131 is manipulated may be protrudingly formed on the outer surface (the front side in the shown embodiment) where the selection button 131 is exposed to the outside. For example, the outer surface of the selection button 131 has a shape, such as "I", "II", "III", or the like, formed thereon which means that it matches any one of sub-containers 220 of the fluid receiving part 200 to be described later.

The selection button 131 may be provided in any shape that enables them to receive a control signal by the manipulation of a user. While in the shown embodiment, the selection button 131 is formed to have a circular cross section, the shape of the selection button 131 may be changed to an ellipse or a polygon.

A plurality of selection buttons 131 may be provided. The plurality of selection buttons 131 may be spaced apart from each other. In the shown embodiment, the selection buttons 131 have three in total that are a first selection button 131*a*, a second selection button 131*b*, and a third selection button 131*c*, and are located to be spaced apart from each other along the outer periphery of the front cover 130.

In an embodiment, the number of selection buttons 131 may be changed according to the number of sub-containers 220 of the fluid receiving part 200. That is, when the plurality of selection buttons 131 are provided as described above, each selection button 131 may be operated so as to correspond to different sub-containers 220. Accordingly, the selection buttons 131 and the sub-containers 220 are provided in the same number, so that any one of the plurality of selection buttons 131 may be operated so as to be matched to any one of the plurality of sub-containers 220.

Although reference numerals are not provided, an indicator may be provided adjacent to the selection button 131. In the shown embodiment, the indicator is provided above the selection button 131. The indicator may function as a passage through which light emitted from the light emitting part 413 of the current carrying part 400, which will be described later, passes. In one embodiment, the indicator may be formed penetratingly in the thickness direction of the front cover 130, that is, in the front-rear direction in the shown embodiment. In the above embodiment, the light emitting part 413 may be provided in the form of an LED lamp, and penetrate through the indicator.

As described above, the plurality of selection buttons 131 may be provided. In this case, a plurality of indicators may also be provided, and may be located adjacent to the plurality of selection buttons 131, respectively.

The button opening 132 is located adjacent to the selection button 131.

The button opening 132 is a passage through which the main button 411 of the current carrying part 400 is exposed to the outside. The button opening 132 is formed penetratingly in the thickness direction of the front cover 130, such as, in the front-rear direction in the shown embodiment. That is, the button opening 132 communicates the interior space of the housing 100 with the outside.

The button opening 132 is located adjacent to the selection button 131. In the shown embodiment, the button opening 132 is located below the selection button 131. In addition, as described above, the plurality of selection buttons 131 may be provided, and may be disposed to be spaced apart from each other in an arc direction of the front cover 130. In this case, the button opening 132 may be located below the selection button 131 located in the center.

As will be described later, the main button 411 may be manipulated by a user to receive a control signal for starting or ending the operation of the fluid processing apparatus 10. That is, the main button 411 may be served as a kind of power button.

The user may manipulate the main button 411 exposed to the outside through the button opening 132 to inputted a control signal for starting the operation of the fluid processing apparatus 10, and may manipulate the selection button 131 to inputted a control signal for the type of processing operation to be performed by the fluid processing apparatus 10. At this time, as the button opening 132 and the selection button 131 are disposed adjacent to each other, the physical distance that the user must move to turn on the power of the fluid processing apparatus 10 and perform the selection of the fluid processing process can be minimized.

In the shown embodiment, the button opening 132 has a circular cross-section and has a circular plate shape formed through the front cover 130 in the thickness direction, that is, in the front-rear direction. It will be understood that the shape of the button opening 132 may be changed according to the shape of the main button 411.

The withdrawal opening 133 is disposed adjacent to the button opening 132.

The withdrawal opening 133 functions as a passage through which the tray 170 is moved into or out of the inner space of the housing 100. The withdrawal opening 133 communicates the interior space of the housing 100 with the outside. The withdrawal opening 133 is formed penetratingly in the thickness direction of the front cover 130.

The withdrawal opening 133 is located adjacent to the button opening 132. In addition, the position of the withdrawal opening 133 may be determined correspondingly according to the position of the tray 170.

In the shown embodiment, the withdrawal opening 133 is located below the button opening 132. As will be described later, the fluid processed by the operation of the fluid processing apparatus 10 is received in the tray 170. At this time, in order to minimize the power required to convey the fluid, it is preferable that the tray 170 is located at the lower side as much as possible. Accordingly, the withdrawal opening 133 may also be located below the button opening 132.

The shape of the withdrawal opening 133 may be determined according to the shape of the tray 170. In the shown embodiment, the withdrawal opening 133 is formed so that the length of the front cover 130 in the circumferential direction, that is, in the left and right direction, is longer than in the height direction of the front cover 130, that is, in the vertical direction.

The rear cover 140 is located behind the space in which the conveying part 300 and the current carrying part 400 are accommodated.

The rear cover 140 forms another side of the housing 100, such as, the rear side in the shown embodiment.

A space is formed inside the rear cover 140. The space communicates with the spaces formed inside the bottom cover 120 and the front cover 130. The support frame 150, the coupling frame 160, the tray 170, the guide frame 180, the conveying part 300, and the current carrying part 400 are accommodated in that space.

Accordingly, it may be considered that the bottom cover 120, the front cover 130, and the rear cover 140 are coupled to form a space therebetween.

The rear cover 140 is provided removably. Specifically, the rear cover 140 is removably coupled to the bottom cover 120, the front cover 130, the support frame 150, and the coupling frame 160.

The rear cover 140 may form therein a space capable of accommodating the components, and may have any shape which enables it to be removably coupled to the bottom cover 120, the front cover 130, the support frame 150, the coupling frame 160, and the like. In the shown embodiment, the rear cover 140 has a rounded arc shape with a predetermined curvature so as to be convex toward the rear side. That is, in the shown embodiment, the upper, lower and front sides of the rear cover 140 are formed to be open.

In the above embodiment, the curvature and radius of the rear cover 140 and the front cover 130 may be formed to be the same. Accordingly, the external appearance of the fluid processing apparatus 10 may be symmetrically formed in the horizontal direction, such as, in the front-rear direction and the left-right direction. As a result, the external appearance of the fluid processing apparatus 10 may be beautiful, and the user's satisfaction may be improved.

In the shown embodiment, the rear cover 140 includes a guide rail 141.

The guide rail 141 supports the guide frame 180. Specifically, the guide rail 141 supports one side of the guide frame 180 facing the rear cover 140, such as, the rear side thereof in the shown embodiment.

The guide rail 141 may be located inside the rear cover 140. In other words, the guide rail 141 may be accommodated in the space formed by the rear cover 140. In the shown embodiment, the guide rail 141 is located on the front side of the rear cover 140.

The guide rail 141 is formed to extend in a direction in which the guide frame 180 extends. In the shown embodiment, the guide rail 141 is formed to extend in the front-rear direction.

A plurality of guide rails 141 may be provided. The plurality of guide rails 141 may be spaced apart from each other, and disposed to face each other. In the shown embodiment, two guide rails 141 are provided and are located to be spaced apart from each other in the left and right directions.

The plurality of guide rails 141 may support the guide frame 180 at different positions. In the shown embodiment, the guide rails 141 may support the left and right sides of the rear portion of the guide frame 180, respectively. That is, it will be appreciated that the guide frame 180 is accommodated in a space formed between the plurality of guide rails 141 spaced apart from each other.

The rear cover 140 is coupled to the support frame 150.

The support frame 150 removably supports the fluid receiving part 200. Additionally, the top cover 110 is removably coupled to the support frame 150 to prevent the fluid receiving part 200 from being arbitrarily exposed to the outside. Furthermore, the support frame 150 is coupled to the front cover 130, the rear cover 140, and the coupling frame 160, respectively, to form a part of the housing 100.

The support frame 150 is accommodated in the inner space of the housing 100. Additionally, the support frame 150 partitions the inner space of the housing 100 together with the coupling frame 160 into a plurality of spaces.

In the shown embodiment, the support frame 150 partitions the inner space of the housing 100 into an upper space and a lower space. The upper space of the housing 100 is defined by being surrounded by the top cover 110 and the support frame 150. The fluid receiving part 200 is accommodated in the upper space. The lower space of the housing 100 is defined by being surrounded by the bottom cover 120, the front cover 130, the rear cover 140, and the support frame 150. The conveying part 300 and the current carrying part 400 are accommodated in the lower space.

The support frame 150 is removably coupled to the top cover 110. In the shown embodiment, the top cover 110 may be moved downward to be coupled to the support frame 150, and may be moved upward to be separated from the support frame 150.

The support frame 150 is coupled to the front cover 130 and the rear cover 140. In an embodiment, the support frame 150 may be removably coupled to the front cover 130 and the rear cover 140.

The fluid receiving part 200 is penetratingly coupled to the support frame 150. The coupling may be achieved by a plurality of support parts 151 and 152 formed in the support frame 150.

In the shown embodiment, the support frame 150 has a circular cross section, and its outer periphery is formed in a band shape extending in a direction toward the coupling frame 160, that is, downward. Accordingly, between the surface of the support frame 150 and its outer periphery, there is formed a predetermined space to which the coupling frame 160 may be inserted and coupled.

Figure 9:
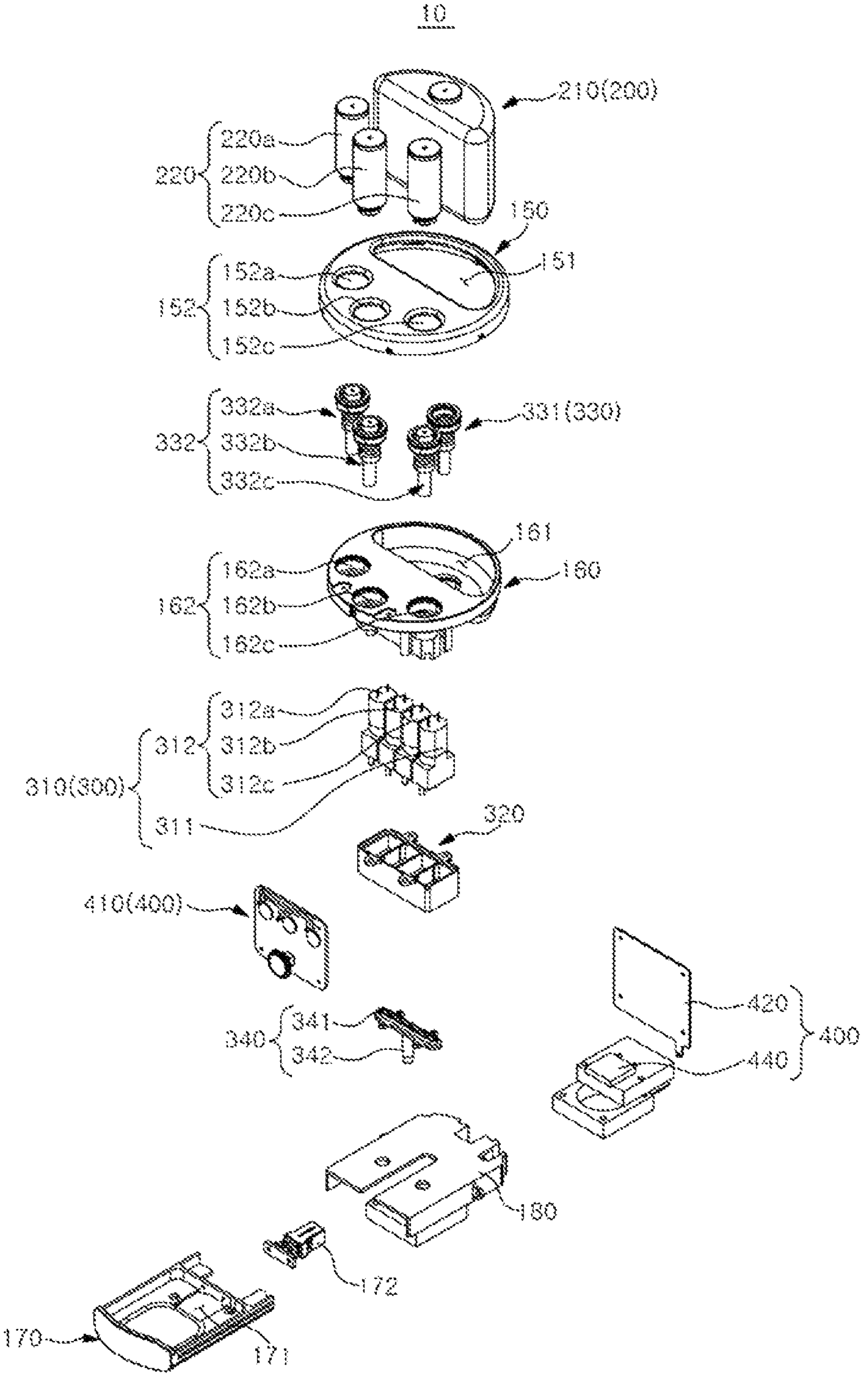
FIG. 9 is an exploded perspective view illustrating the fluid processing apparatus of FIG. 1.
Figure 10:
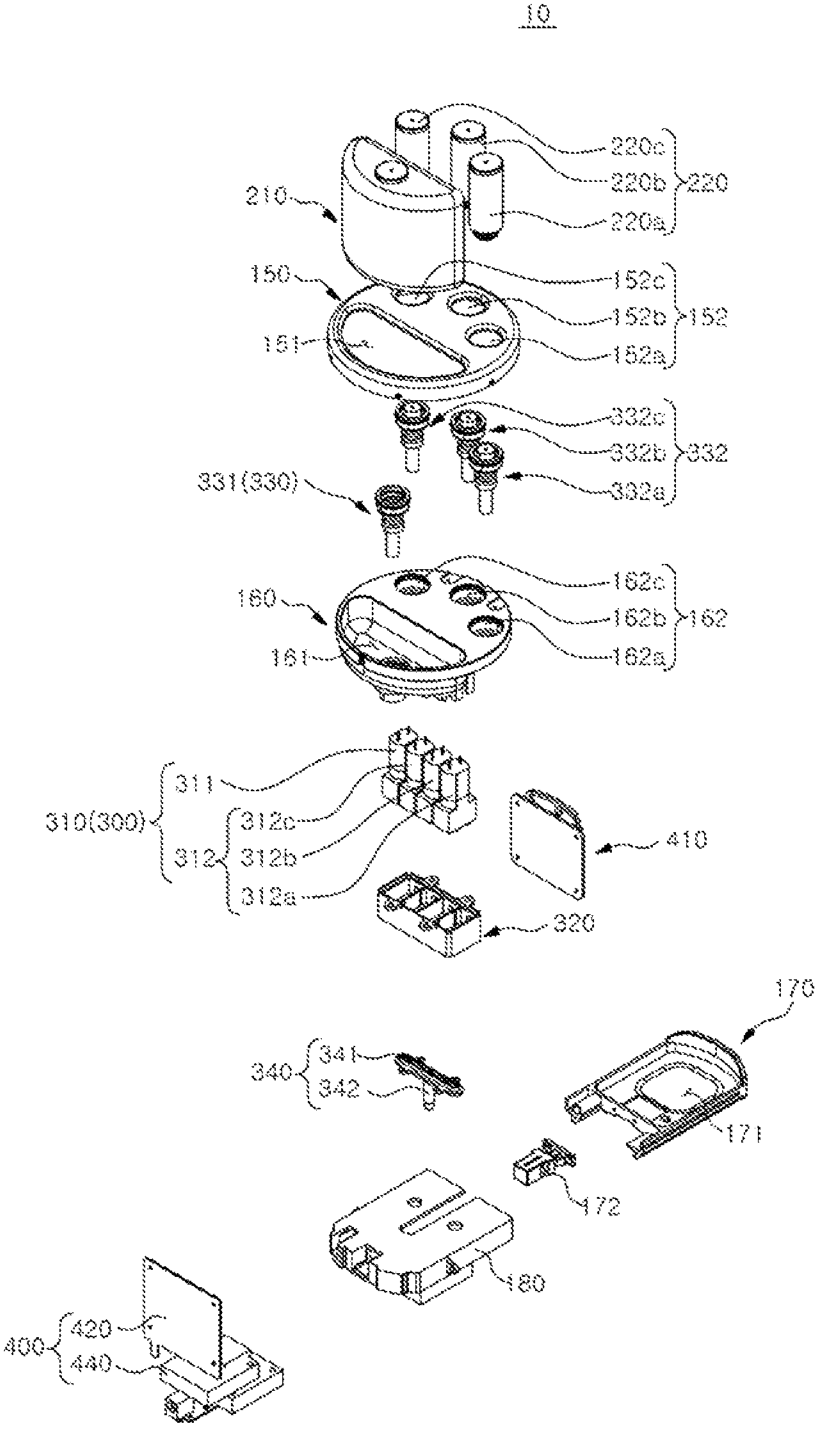
FIG. 10 is an exploded perspective view from another angle illustrating the fluid processing apparatus of FIG. 1.

In the shown embodiment, the support frame 150 includes a main support 151 and a sub-support 152 (best shown in FIGS. 9 and 10).

The main support part 151 supports a main container 210 of the fluid receiving part 200. The main support part 151 is penetratingly formed in the thickness direction of the cross-section of the support frame 150, such as, in the vertical direction in the shown embodiment. It will be understood that the direction in which the main support part 151 penetrates is the same as the direction in which the main container 210 penetrates or is withdrawn from the main support part 151.

The main support part 151 is located on one side of the support frame 150 on the cross-section of the support frame 150, such as being located biased toward the rear side in the shown embodiment. At this time, the sub-support 152 is located on the other side of the support frame 150 on the cross section of the support frame 150, such as being located biased toward the front side in the shown embodiment. The position of the main support 151 may be changed according to the position of the main container 210.

The shape of the main support 151 may be changed according to the shape of the main container 210, and specifically, the shape of the cross-section of the main container 210. In the shown embodiment, the front side of the main support 151 extends in the left and right direction, and the rear side thereof has a circular arc shape with its center located on the front side, and convex toward the rear side. That is, in the shown embodiment, the shape of the cross-section of the main support 151 is a semicircular shape.

The cross-sectional area of the main support 151 may be greater than that of the sub-support 152. This is because the volume of the main fluid accommodated in the main container 210 inserted into the main support 151 is usually greater than the volume of the sub-fluid accommodated in the sub-container 220 inserted into the sub-support 152.

The main support part 151 communicates with the main coupling part 161 of the coupling frame 160. The main container 210 may be partially accommodated in the main coupling part 161 after penetrating the main support part 151.

The sub-support 152 is located adjacent to the main support 151.

The sub-support 152 supports the sub-container 220 of the fluid receiving part 200. The sub-support part 152 is penetratingly formed in the thickness direction of the cross-section of the support frame 150, such as, the vertical direction in the shown embodiment. It will be understood that the direction in which the sub-support part 152 penetrates is the same as the direction in which the sub-container 220 penetrates or is withdrawn from the main support part 151.

The sub-support 152 is located on the other side of the support frame 150 on the cross section of the support frame 150, such as being located biased toward the front side in the shown embodiment. That is, the sub-support 152 is located biased in a direction opposite to the main support 151. The position of the sub-support 152 may be changed according to the position of the sub-container 220.

The shape of the sub-support 152 may be changed according to the shape of the sub-container 220, and specifically, the shape of the cross-section of the sub-container 220. In the shown embodiment, the sub-support 152 is formed to have a circular cross section.

A cross-sectional area of the sub-support 152 may be smaller than that of the main support 151. As described above, this is because the cross-sectional area of the sub-container 220 coupled to the sub-support 152 is smaller than the cross-sectional area of the main container 210 coupled to the main support 151.

The sub-support part 152 communicates with the sub-coupling part 162 of the coupling frame 160. A portion of the sub-container 220 may be accommodated in the sub-coupling part 162 after penetrating the sub-support part 152. As will be described later, the sub-support part 152 may include a first sub-support part **152*a*, a second sub-support part 152*b*, and a third sub-support part 152*c*. In the above embodiment, a first sub-support part 152*a*, a second sub-support part 152*b*, and a third sub-support part 152*c* communicate with a first sub-coupling part 162*a*, a second sub-coupling part 162*b*, and a third sub-coupling part 162*c***, respectively.

A plurality of sub-support parts 152 may be formed. This is because a plurality of sub-fluids having different effects are respectively received in the sub-containers 220 coupled to the sub-support 152, and are respectively mixed with the main fluid. The plurality of sub-support parts 152 may be disposed to be spaced apart from each other.

In the shown embodiment, the sub-support parts 152 are three, and include the first sub-support part 152*a* located on the left, the second sub-support part 152*b* located in the central portion, and the third sub-support part 152*c* located on the right. Additionally, the first sub-support part 152*a*, the second sub-support part 152*b*, and the third sub-support part 152*c* are disposed adjacent to and along the outer periphery of the cross-section of the support frame 150. The number and arrangement method of the sub-supporters 152 may be changed according to the number or the like of sub-containers 220 provided in the fluid processing apparatus 10.

The support frame 150 is coupled to the coupling frame 160.

The coupling frame 160 is removably coupled to the fluid receiving part 200. Additionally, the coupling frame 160 is coupled to a valve member 330 of conveying part 300. Accordingly, the fluid receiving part 200 coupled to the coupling frame 160 may be coupled to the valve member 330 to be in fluid communication therewith.

In addition, the coupling frame 160 is removably coupled to the support frame 150, and forms a part of the housing 100. In the shown embodiment, the coupling frame 160 is partially accommodated in the space formed between the end surface and the outer periphery of the support frame 150.

The coupling frame 160 is accommodated in the inner space of the housing 100. The coupling frame 160 partitions the inner space of the housing 100 together with the support frame 150 into a plurality of spaces.

In the shown embodiment, the coupling frame 160 partitions the inner space of the housing 100 into an upper space and a lower space. Since the description of the components accommodated in the partitioned upper space and the lower space has been provided above, it will be omitted.

The coupling frame 160 is removably coupled to the support frame 150. In the shown embodiment, the coupling frame 160 is accommodated in the space formed inside the support frame 150. Accordingly, it may be said that the coupling frame 160 is coupled to the front cover 130 and the rear cover 140 through the support frame 150, respectively.

The fluid receiving part 200 is accommodated in the coupling frame 160. This may be achieved by the plurality of coupling parts 161 and 162 provided in the coupling frame 160.

In the shown embodiment, the coupling frame 160 has a circular cross-section, and is a three-dimensional shape including a plurality of portions protruding downward. At this time, the cross-section of the coupling frame 160 is formed to have a shape corresponding to the cross-sectional shape of the support frame 150, and to have the diameter smaller than that of the cross-section of the support frame 150.

Additionally, it will be understood that the plurality of portions protruding downward among the portions of the coupling frame 160 are portions forming the plurality of coupling parts 161 and 162.

The valve member 330 is penetratingly coupled to the coupling frame 160. Specifically, an upper head part (no reference numerals) of the valve member 330 having a relatively large diameter is located inside the coupling frame 160, and the rest part except the head part may be located outside the frame 160.

In the shown embodiment, the coupling frame 160 includes the main coupling part 161 and the sub-coupling part 162.

The main coupling part 161 is a space in which the main container 210 of the fluid receiving part 200 is partially accommodated. In the shown embodiment, the lower portion of the main container 210 is accommodated in the main coupling part 161. Additionally, the main valve member 331 of the valve member 330 is partially accommodated in the main coupling part 161. That is, a portion (i.e., the upper head portion) of the main valve member 331 may be located inside the main coupling part 161.

Accordingly, the main container 210 coupled to the main coupling part 161 may be coupled to the main valve member 331 to be in fluid communication therewith. Accordingly, the main container 210 and the main valve member 331 may communicate with each other so that the main fluid received in the main container 210 may flow through the main valve member 331.

The main coupling part 161 is a space formed by being partially surrounded by the coupling frame 160. In addition, another portion of the main coupling part 161 may be openly formed to communicate with the outside. In the shown embodiment, the horizontal direction sides of the main coupling part 161, such as, the left, right, front and the rear sides, are surrounded by the coupling frame 160. In addition, the upper side of the main coupling part 161 is opened and functions as a passage into which the main container 210 and the main valve member 331 can be inserted. Furthermore, the lower side of the main coupling part 161 may be surrounded by the coupling frame 160, and a through hole may be formed therein to function as a passage through which the main valve member 331 extends downward.

The main coupling part 161 is located on one side of the coupling frame 160 on the cross-section of the coupling frame 160, such as being located biased toward the rear side in the shown embodiment. At this time, the sub-coupling part 162 is located on the other side of the coupling frame 160 on the cross-section of the coupling frame 160, such as being located biased toward the front side in the shown embodiment. The position of the main coupling part 161 may be changed according to the position of the main container 210.

The shape of the main coupling part 161 may be changed according to the shape of the main container 210, and specifically, the shape of the cross-section of the main container 210. In the shown embodiment, the front side of the main coupling part 161 extends in the left and right direction, and the rear side thereof has a circular arc shape with its center located on the front side, and convex toward the rear side. That is, in the shown embodiment, the shape of the cross-section of the main coupling part 161 is a semicircular shape. It will be understood that the shape of the main coupling part 161 is the same as the shape of the main support part 151.

The cross-sectional area of the main coupling part 161 may be greater than that of the sub-coupling part 162. This is due to the difference in the shape and size between the main container 210 and the sub-container 220 as described above.

The main coupling part 161 communicates with the main support part 151. The main container 210 may be partially accommodated in the main coupling part 161 after penetrating the main support part 151. In the above embodiment, the shape of the cross-section of the main coupling part 161 may be formed to be the same as the shape of the cross-section of the main support part 151. Also, in the above embodiment, the main coupling part 161 may be disposed to overlap the main support part 151 in an up and down direction.

The sub-coupling part 162 is located adjacent to the main coupling part 161.

The sub-coupling part 162 is a space in which the sub-container 220 of the fluid receiving part 200 is partially accommodated. In the shown embodiment, the lower portion of the sub-container 220 is accommodated in the sub-coupling part 162. In addition, the sub-valve member 332 of the valve member 330 is partially accommodated in the sub-coupling part 162. That is, a portion (i.e., an upper head portion) of the sub-valve member 332 may be located inside the sub-coupling part 162.

Accordingly, the sub-container 220 coupled to the sub-coupling part 162 may be coupled to the sub-valve member 332 to be in fluid communication therewith. Accordingly, the sub-container 220 and the sub-valve member 332 are communicated with each other, and the sub-fluid received in the sub-container 220 may flow through the sub-valve member 332.

The sub-coupling part 162 is a space formed by being partially surrounded by the coupling frame 160. In addition, another portion of the sub-coupling part 162 may be openly formed to communicate with the outside. In the shown embodiment, the horizontal direction sides of the sub-coupling part 162, such as, the left, right, front and the rear sides, are surrounded by the coupling frame 160. In addition, the upper side of the sub-coupling part 162 is opened, and functions as a passage into which the sub-container 220 and the sub-valve member 332 can be inserted. Furthermore, the lower side of the sub-coupling part 162 may be surrounded by the coupling frame 160, and a through hole may be formed therein to function as a passage through which the sub-valve member 332 extends downward.

The sub-coupling part 162 is located on the other side of the coupling frame 160 on the cross-section of the coupling frame 160, such as being located biased toward the rear side in the shown embodiment. It will be understood that the position of the sub-coupling part 162 is opposite to the position of the main coupling part 161. The position of the coupling part 162 may be changed according to the position of the sub-container 220.

The shape of the sub-coupling part 162 may be changed according to the shape of the sub-container 220, and specifically, the shape of the cross-section of the sub-container 220. In the shown embodiment, the sub-coupling part 162 is formed to have a circular cross section. It will be understood that the shape of the sub-coupling part 162 is the same as the shape of the sub-support part 152.

A cross-sectional area of the sub-coupling part 162 may be smaller than that of the main coupling part 161. This is due to the difference in the shape and size between the main container 210 and the sub-container 220 as described above.

The sub-coupling part 162 communicates with the sub-support part 152. A portion of the sub-container 220 may be accommodated in the sub-coupling part 162 after penetrating the sub-support part 152. In the above embodiment, the shape of the cross section of the sub-coupling part 162 may be formed to be the same as the shape of the cross section of the sub-support part 152. In addition, in the above embodiment, the sub-coupling part 162 may be disposed to overlap the sub-support part 152 in the up and down direction.

A plurality of sub-coupling parts 162 may be formed. As described above, this is because the sub-container 220 and the sub-fluid accommodated therein may be provided in plurality. The plurality of sub-coupling parts 162 may be disposed to be spaced apart from each other.

In the shown embodiment, the sub-coupling parts 162 are three, and include the first sub-coupling part **162*a* located on the left, the second sub-coupling part 162*b* located in the central portion, and the third sub-coupling part 162*c* located on the right. Additionally, the first sub-coupling part 162*a*, the second sub-coupling part 162*b*, and the third sub-coupling part 162*c* are disposed adjacent to and along the outer periphery of the cross-section of the coupling frame 160. The number and arrangement of the sub-coupling parts 162 may be changed according to the number of the sub-containers 220 and the number and arrangement of the sub-support parts 152**.

The tray 170 is a space in which a fluid processed according to a control signal inputted by a user is accommodated. A user may obtain a desired effect or efficacy by applying or spraying the fluid accommodated in the tray 170.

The tray 170 is accommodated in the inner space of the housing 100. Specifically, the tray 170 is accommodated in the lower space of the space of the housing 100. Accordingly, the tray 170 is located below the fluid receiving part 200 and the conveying part 300. Accordingly, the fluid on which the processing process has been performed may be accommodated in the tray 170 by dropping by gravity.

The tray 170 may be formed to have an extension length in one direction longer than an extension length in another direction. In the shown embodiment, the tray 170 is formed to have an extension length in the front-rear direction longer than the extension length in the left-right direction.

The tray 170 is withdrawably accommodated in the inner space of the housing 100. In other words, the tray 170 is accommodated in the inner space of the housing 100 so as to be slidably movable in the extension direction (front and rear direction in the shown embodiment). In this case, the tray 170 may be retracted in or withdrawn from the inner space through the withdrawal opening 133 formed penetratingly through the front cover 130.

One end of the tray 170 in the extension direction, such as the front end thereof in the shown embodiment, may be exposed to the outside. The one end of the tray 170 may be formed to be rounded so as to be convex outward. In an embodiment, the one end of the tray 170 may be formed in a curved surface having the same curvature as that of the front cover 130.

One side of the tray 170, such as the upper side in the shown embodiment, may be formed to be open. The fluid that has undergone the processing process may fall and be collected into the fall space 171 formed inside the tray 170 through the open upper side.

The inner side of the tray 170, such as the rear side in the shown embodiment, may be coupled to the rear cover 140. In this regard, arbitrary withdrawal of the tray 170 can be prevented by a locking device 172 provided between the rear side of the tray 170 and the rear cover 140.

The other side of the tray 170, such as the lower side thereof in the shown embodiment, may be in contact with the temperature control member 440 of the current carrying part 400. Accordingly, the fluid accommodated in the tray 170 may be heated or cooled, and thus its temperature may be adjusted.

The tray 170 may be supported by the guide frame 180. The tray 170 may be inserted into or withdrawn from the space formed inside the guide frame 180. In other words, the tray 170 is slidably accommodated in the space of the guide frame 180.

The tray 170 may be formed of a material having high thermal conductivity. This is for the accommodated fluid to be easily heated or cooled by the temperature control member 440.

The tray 170 may be formed of a material that is easy to clean. This is to prevent the fluid that has been accommodated in the tray 170 from remaining arbitrarily and mixed with or contaminating the fluid introduced next time.

In one embodiment, the tray 170 may be formed of a stainless steel material.

In the shown embodiment, the tray 170 includes the fall space 171 and the locking device 172.

The fall space 171 is a space in which the fluid that has been subjected to the processing process falls, collected and accommodated. One side of the drop space 171 facing the fluid receiving part 200 and the conveying part 300, such as the upper side thereof in the shown embodiment, is formed to be open. As described above, since the tray 170 is located below the fluid receiving part 200 and the conveying part 300, the fluid on which the processing process has been performed can fall by gravity and enter the fall space 171.

Another side of the falling space 171, such as the lower side in the shown embodiment, is closed by the lower surface of the tray 170. At this time, when the temperature control member 440 is in contact with the lower surface of the tray 170, and heats or cools the tray 170, the fluid accommodated in the fall space 171 is also heated or cooled to adjust its temperature.

In an embodiment, an impregnation member, such as cotton, puff, or the like, may be accommodated in the fall space 171. In the above embodiment, the processed fluid directly falls on the impregnation member, so that the impregnation member can be rapidly impregnated therewith.

The locking device 172 couples or decouples the tray 170 with the housing 100, specifically the rear cover 140. By the locking device 172, the tray 170 inserted into the inner space of the housing 100 may not be arbitrarily withdrawn.

The locking device 172 may be coupled to the rear cover 140. One side of the locking device 172, such as the rear side thereof in the shown embodiment, may be coupled to the inner surface of the rear cover 140, such as, the front side surface thereof. Another side of the locking device 172, such as the front side thereof in the shown embodiment, may be coupled to the rear side of the tray 170.

The locking device 172 may be provided in such a way that the distance between the one side and the other side is decreased when the locking device 172 is pressed once, and that the distance between the one side and the other side is increased when the locking device 172 is pressed again. That is, in the above embodiment, the locking device 172 may be provided in the form of a toggle switch.

The locking device 172 may be provided in any form which enables it to regulate the tray 170 such that the tray 170 slides only when an external force is applied thereto. For example, the locking device 172 may be provided in the form of a magnetic switch or the like, which is coupled to the rear side of the tray 170 at its one portion and coupled to the front side of the rear cover 140 at its another portion, and which applies attractive force to both sides.

The guide frame 180 accommodates the tray 170 withdrawably. The tray 170 may be moved in its extension direction, such as, the front-rear direction, and may be coupled to the guide frame 180 or withdrawn out from the guide frame 180.

The guide frame 180 is located at the lower side of the inner space of the housing 100. The guide frame 180 is located below the fluid receiving part 200 and the conveying part 300.

The guide frame 180 extends in one direction, such as in the front-rear direction in the shown embodiment. The extension direction of the guide frame 180 may be the same as the extension direction of the tray 170 and the sliding direction of the tray 170.

A space into which the tray 170 is inserted is formed inside the guide frame 180. The space may be surrounded by a plurality of frames constituting the guide frame 180. The tray 170 inserted into the space may be supported by a plurality of the frames.

One side of the space of the guide frame 180 facing the fluid receiving part 200 or the conveying part 300, such as the upper side thereof in the shown embodiment, is formed to be open. The fluid that has been processed can pass through the one side and fall into the space of the guide frame 180.

The one side of the guide frame 180 communicates with the fall space 171 of the tray 170. The fluid that has undergone the processing process may pass through the one side of the guide frame 180 and enter the fall space 171.

Another side of the space of the guide frame 180 opposite to the fluid receiving part 200 or the conveying part 300, such as the lower side thereof in the shown embodiment, is formed to be open. The tray 170 accommodated in the space of the guide frame 180 may be in contact with the temperature control member 440 located below the guide frame 180. Accordingly, the fluid accommodated in the fall space 171 may be heated or cooled by the temperature control member 440 to adjust its temperature.

A detailed description of the process will be provided later.

(2) Description of the Fluid Receiving Part 200

Referring to FIGS. 4 to 14, the fluid processing apparatus 10 according to the shown embodiment includes the fluid receiving part 200.

The fluid receiving part 200 receives a fluid which a user intends to subject to the processing. A space is formed inside the fluid receiving part 200 to contain a fluid selected by the user. That is, the fluid receiving part 200 functions as a kind of container.

The fluid receiving part 200 is removably coupled to the housing 100. Specifically, the fluid receiving part 200 is penetratingly coupled to the support frame 150, is partially accommodated in the coupling frame 160, and is removably coupled to the housing 100.

The fluid receiving part 200 coupled to the housing 100 may not be exposed to the outside. That is, after the fluid receiving part 200 is coupled to the support frame 150 and the coupling frame 160, the top cover 110 covers the coupled fluid receiving part 200 and is coupled to the support frame 150. Accordingly, the fluid receiving part 200 is not arbitrarily exposed to the outside, and contamination caused by the exposure can be prevented.

The space of the fluid receiving part 200 may be in communication with the outside or the communication may be blocked. Although no reference numeral is provided, a lid that is removably coupled to the upper side of the fluid receiving part 200 is provided. The user may open or close the space formed inside the fluid receiving part 200 by coupling the lid to the fluid receiving part 200 or removing the lid from the fluid receiving part 200.

The fluid receiving part 200 communicates with the valve member 330 of the conveying part 300. The fluid accommodated in the fluid receiving part 200 may flow to the valve member 330. At this time, the fluid can flow only when the fluid processing apparatus 10 is operated, which is achieved by a pump member 310.

The fluid receiving part 200 may be formed of a transparent material. This is to allow a user to easily identify the amount of fluid remaining in the fluid receiving part 200 without opening the fluid receiving part 200. In one embodiment, the fluid receiving part 200 may be formed of a transparent synthetic resin material.

As described above, the top cover 110 covering the fluid receiving part 200 may also be formed of a transparent material. Accordingly, the user can easily recognize the amount of the remaining fluid without separating the top cover 110 or the fluid receiving part 200 from the fluid processing apparatus 10.

In the shown embodiment, the fluid receiving part 200 includes the main container 210 and the sub-container 220.

The main container 210 contains the main fluid. The main container 210 is removably coupled to the housing 100. The main container 210 coupled to the housing 100 may communicate with the main valve member 331 of the valve member 330.

The main container 210 may be singularly provided. This is because the single main fluid or single kind of main fluid is generally provided considering that the main fluid accommodated in the main container 210 functions as a solvent of the sub-fluid. Alternatively, the main container 210 may be provided plurally. In the above embodiment, the main fluid may be provided in a plurality of kinds.

The main container 210 is formed to have a greater volume than the sub-container 220. This is due to the fact that since the main fluid received in the main container 210 functions as a solvent of the sub-fluid, the amount of the main fluid is generally larger than that of the sub-fluid. In the shown embodiment, the volume of the main container 210 may be formed greater than the sum of the volumes of the plurality of sub-containers 220.

The main container 210 is formed to have a predetermined shape. In the shown embodiment, the main container 210 has the front side which is a flat surface, and the rear side which is a curved surface shape convex outwardly. That is, in the shown embodiment, the shape of the cross-section of the main container 210 is semicircular.

The shape of the main container 210 may have any shape which enables it to have a space formed therein, and allows the main fluid to be received in the space. However, the shape of the main container 210 is preferably determined to correspond to the shapes of the main support part 151 of the support frame 150 and the main coupling part 161 of the coupling frame 160.

The main container 210 is coupled to the support frame 150. Specifically, the main container 210 is removably penetratingly coupled to the main support portion 151 of the support frame 150.

The main container 210 is coupled to the coupling frame 160. Specifically, the main container 210 is removably accommodated in part in the main coupling part 161 of the coupling frame 160. In the shown embodiment, the lower portion of the main container 210 is accommodated in the main coupling part 161.

The main container 210 may be located biased toward one side in the horizontal direction. In the shown embodiment, the main container 210 is located biased toward the rear side of the support frame 150 and the coupling frame 160. At this time, the sub-container 220 is located on the front side of the support frame 150 and the coupling frame (160), so that it is opposite the main container 210. The position of the main container 210 may be changed according to the positions of the sub-container 220 and the valve member 330.

The main container 210 communicates with the main valve member 331 of the valve member 330. At this time, the main valve member 331 is opened only when the main pump member 311 of the pump member 310 is operated, so that the main fluid received in the main container 210 can flow toward the mixing nozzle 340. A detailed description thereof will be provided later.

The sub-container 220 is disposed adjacent to the main container 210.

The sub-container 220 receives the sub-fluid. The sub-container 220 is removably coupled to the housing 100. The sub-container 220 coupled to the housing 100 may communicate with the sub-valve member 332 of the valve member 330.

A plurality of sub-containers 220 may be provided. The sub-fluids received in the sub-containers 220 may be provided in various types, having different functionalities. In the shown embodiment, the sub-containers 220 are three including the first sub-container 220*a*, the second sub-container 220*b* and the third sub-container 220*c*, but its number may be changed.

Different sub-fluids may be received in the plurality of sub-containers 220. Accordingly, a user may select a sub-fluid having a desired functionality from among the sub-fluids received in the plurality of sub-containers 220, and mix it with the main fluid, thereby manufacturing a mixed fluid having a desired functionality.

The sub-container 220 is formed to have a smaller volume than the main container 210. This is because the sub-fluid accommodated in the sub-container 220 functions as a solute of the main fluid, and the amount of the sub-fluid is generally less than that of the main fluid. In the shown embodiment, the sum of the volumes of the first sub-container 220*a*, the second sub-container 220*b*, and the third sub-container 220*c* may be smaller than the volume of the main vessel 210.

The sub-container 220 is formed to have a predetermined shape. In the shown embodiment, the sub-container 220 has a circular cross-section and has a cylindrical shape extending in the longitudinal direction, that is, the vertical direction.

The shape of the sub-container 220 may have any shape which enables it to have a space formed therein, and allows the sub-fluid to be received in the space. However, it is preferable that the shape of the sub-container 220 is determined to correspond to the shapes of the sub-support part 152 of the support frame 150 and the sub-coupling part 162 of the coupling frame 160.

The sub-container 220 is coupled to the support frame 150. Specifically, the sub-container 220 is removably penetratingly coupled to the sub-support 152 of the support frame 150.

The sub-container 220 is coupled to the coupling frame 160. Specifically, the sub-container 220 is removably accommodated in the sub-coupling part 162 of the coupling frame 160. In the shown embodiment, the lower portion of the sub-container 220 is accommodated in the sub-coupling part 162.

The sub-container 220 may be located biased toward the other side in the horizontal direction. In the shown embodiment, the sub-container 220 is located biased toward the front side of the support frame 150 and the coupling frame 160. In this case, as described above, the main container 210 is located on the front side opposite to the sub-container 220.

The position of the sub-container 220 may be changed according to the positions of the main container 210 and the valve member 330.

The sub-container 220 communicates with the sub-valve member 332 of the valve member 330. Specifically, the first sub-container 220*a* located on the left communicates with the first sub-valve member 332*a*. In addition, the second sub-container 220*b* located at the center communicates with the second sub-valve member 332*b*, and the third sub-container 220*c* located on the right side communicates with the third sub-valve member 332*c*.

At this time, each sub-valve member 332*a*, 332*b* or 332*c* is opened only when each sub-pump member 312*a*, 312*b* or 312*c* of the pump member 310 is operated, and the sub-fluid received in the inside of each sub-container 220*a*, 220*b* or 220*c* may flow toward the mixing nozzle 340. A detailed description thereof will be provided later.

(3) Description of the Conveying Part 300

Referring back to FIGS. 4 to 14, the fluid processing apparatus 10 according to the shown embodiment includes the conveying part 300.

The conveying part 300 applies a conveying force to the main fluid or sub-fluid received in the fluid receiving part 200. Accordingly, the main fluid or the sub-fluid may be mixed and moved toward the tray 170. The main fluid or sub-fluid received in the tray 170 is heated or cooled by the temperature control member 440 of the current carrying part 400, so that a fluid desired by the user can be provided.

The conveying part 300 is accommodated in the inner space of the housing 100. Specifically, the conveying part 300 is accommodated in a space formed by being surrounded by the bottom cover 120, the front cover 130 and the rear cover 140 under the support frame 150 and the coupling frame 160. That is, the conveying part 300 is not exposed to the outside of the housing 100.

The conveying part 300 communicates with the fluid receiving part 200. The main fluid or sub-fluid received in the fluid receiving part 200 may flow to the transfer part 300. At this time, as described above, the main fluid or the sub-fluid may flow only when the pump member 310 is operated.

The conveying part 300 is electrically connected to the current carrying part 400. Power required to operate the conveying part 300, particularly the pump member 310, may be delivered from the current carrying part 400. In addition, a control signal for the type in which the pump member 310 is operated may also be inputted through the current carrying part 400.

The conveying part 300 is located adjacent to the tray 170. Specifically, the conveying part 300 is located on the upper side of the tray 170, and the main fluid or sub-fluid may flow and fall into the fall space 171 of the tray 170.

The components of the conveying part 300 to be described below may communicate with each other. In other words, each component of the conveying part 300 is connected to each other in a fluid communication manner.

In the shown embodiment, the conveying part 300 includes the pump member 310, a pump housing 320, the valve member 330, the mixing nozzle 340, and a hose member 350.

The pump member 310 communicates with the fluid receiving part 200. The main fluid or sub-fluid received in the fluid receiving part 200 may flow to the pump member 310.

The pump member 310 communicates with the valve member 330. When the pump member 310 is operated according to a control signal inputted by the user, the valve member 330 is opened, so that the main fluid or the sub-fluid received in the fluid receiving part 200 may flow.

The pump member 310 communicates with the mixing nozzle 340. The main fluid or the sub-fluid caused to flow by the conveying force applied by the pump member 310 may flow to the mixing nozzle 340, and be mixed with each other.

The pump member 310 is electrically connected to the temperature control member 440. Specifically, the pump member 310 may be electrically connected to the inputted PCB 410, and may be operated according to a control signal applied by a user. In addition, the pump member 310 may be electrically connected to the output PCB 420, and be receive power required for operation.

The pump member 310 is located in a lower space of the inner space of the housing 100. The pump member 310 is located below the support frame 150 and the coupling frame 160 with the mixing nozzle 340 interposed therebetween. In addition, the pump member 310 is located above the tray 170 with the mixing nozzle 340 interposed therebetween.

The pump member 310 may be provided in any shape which enables it to apply a conveying force to the fluid when it is operated according to a control signal. In one embodiment, the pump member 310 may be provided in the form of a motor pump that is rotated by an electrical signal to apply a conveying force to the fluid.

A plurality of pump members 310 may be provided. The plurality of pump members 310 may communicate with the plurality of fluid receiving parts 200 through the plurality of valve members 330, respectively.

In the shown embodiment, the pump member 310 includes the main pump member 311 and the sub-pump member 312. Also, in the shown embodiment, the sub-pump member 312 includes the first sub-pump member 312*a*, the second sub-pump member 312*b*, and the third sub-pump member 312*c*.

That is, it will be understood that the pump member 310 may be provided as many as the number of the fluid receiving parts 200 provided.

The main pump member 311 communicates with the main container 210 through the main valve member 331. The first sub-pump member 312*a* communicates with the first sub-container 220*a* through the first sub-valve member 332*a*. The second sub-pump member 312*b* communicates with the second sub-container 220*b* through the second sub-valve member 332*b*, and the third sub-pump member 312*c* communicates with the third sub-container 220*c* through the third sub-valve member 332*c*.

The operation of the plurality of pump members 310 may be independently controlled. As described above, a user may inputted a control signal by manipulating the current carrying part 400. At this time, any one or more of the plurality of pump members 310 may be operated according to the inputted control signal.

In this case, as the main fluid received in the main container 210 functions as a solvent of the sub-fluid, the main pump member 311 of the plurality of pump members 310 is operated whenever a control signal is input, but the plurality of sub-pump members 312 are preferably operated independently according to the inputted control signal.

The pump member 310 is accommodated in the pump housing 320.

The pump housing 320 accommodates the pump member 310 to fix the position of the pump member 310. The pump housing 320 may be coupled to the housing 100, specifically, to the coupling frame 160 to attenuate vibrations generated by the operation of the pump member 310. Accordingly, a coupling state between the pump member 310, the valve member 330, the mixing nozzle 340, and the hose member 350 may be stably maintained.

A space is formed inside the pump housing 320. The pump member 310 may be accommodated in that space. As described above, the plurality of pump members 310 may be provided. Accordingly, the space of the pump housing 320 is also divided into a plurality of regions, and any one of the plurality of pump members 310 may be accommodated in each of the partitioned regions. In the shown embodiment, the space of the pump housing 320 is divided into four regions.

The space of the pump housing 320 communicates with the outside. Specifically, the pump member 310 accommodated in the space of the pump housing 320 may communicate with the valve member 330 and the mixing nozzle 340, respectively.

The valve member 330 permits or blocks communication between the fluid receiving part 200 and the pump member 310 depending on whether or not the pump member 310 operates.

The valve member 330 communicates with the fluid receiving part 200. In other words, the valve member 330 is connected to the fluid receiving part 200 to be in fluid communication therewith. In the shown embodiment, the upper side of the valve member 330 is penetratingly coupled to the coupling frame 160 and is connected to the lower side of the fluid receiving part 200 accommodated in the coupling frame 160 to be in fluid communication therewith.

The valve member 330 communicates with the pump member 310. In the shown embodiment, the lower side of the valve member 330 is connected to the pump member 310 through the hose member 350 to be in fluid communication therewith.

The valve member 330 is located below the fluid receiving part 200. Accordingly, when the valve member 330 is opened, the main fluid or the sub-fluid received in the fluid receiving part 200 by the gravity and the conveying force applied by the pump member 310 can easily flow toward the pump member 310.

The valve member 330 may be provided in any form which enables it to permit or block the flow of a fluid. In an embodiment, the valve member 330 may be provided as a check valve.

In an embodiment in which the valve member 330 is provided as a check valve, the valve member 330 may limit the direction in which the main fluid or the sub-fluid flows, to one direction in which it flows from the fluid receiving part 200 to the pump member 310. Accordingly, the reverse flow of the main fluid or the sub-fluid (i.e., the direction from the pump member 310 toward the fluid receiving part 200) is prevented, so that the operational reliability of the fluid processing apparatus 10 may be improved.

The plurality of valve members 330 may be provided. The plurality of valve members 330 may be connected to the plurality of fluid receiving parts 200 and the pump member 310 to be in fluid communication therewith.

In the shown embodiment, the valve member 330 includes the main valve member 331 and the sub-valve member 332. Also, the sub-valve member 332 includes the first sub-valve member 332*a*, the second sub-valve member 332*b*, and the third sub-valve member 332*c*.

The main valve member 331 connects the main container 210 and the main pump member 311 in fluid communication therebetween.

The main valve member 331 is coupled to the main container 210 to be in fluid communication therewith. Specifically, the upper side of the main valve member 331 is accommodated in the main coupling part 161 of the coupling frame 160, and the remaining part thereof penetrates through the coupling frame 160 and extends downward.

Figure 11:
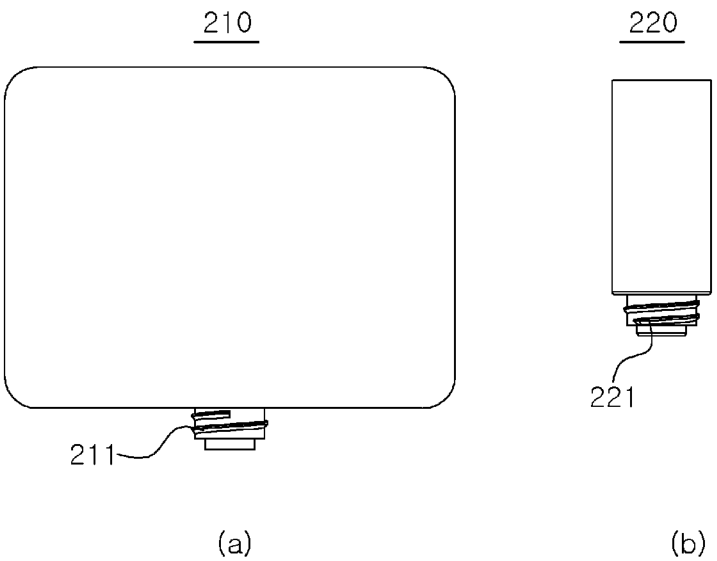
FIG. 11 is a front view illustrating a main container (a) and a sub-container (b) provided in the fluid processing apparatus of FIG. 1.
Figure 12:
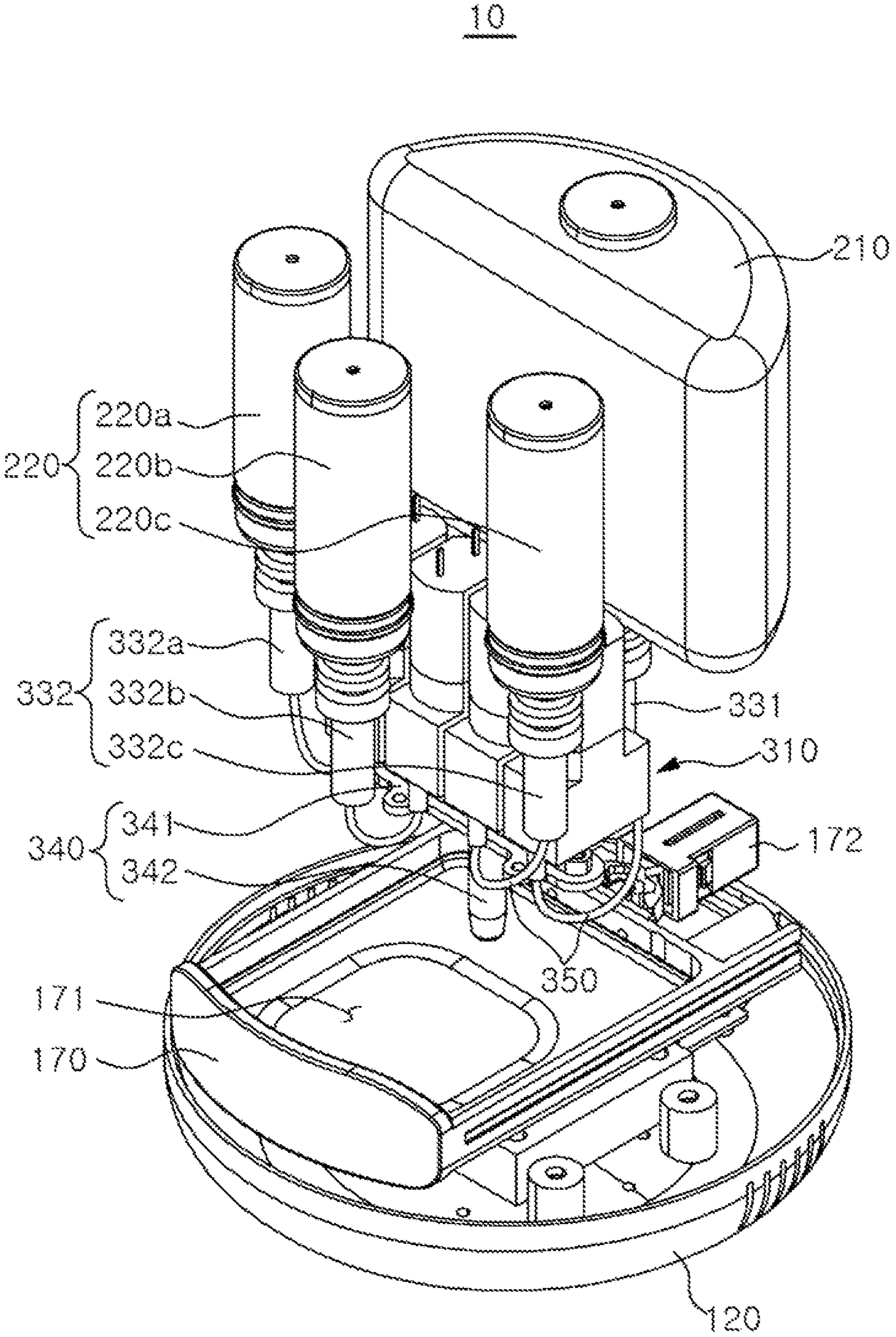
FIG. 12 is a perspective view illustrating a connection relationship between a fluid receiving part and a conveying part provided in the fluid processing apparatus of FIG. 1.
Figure 13:
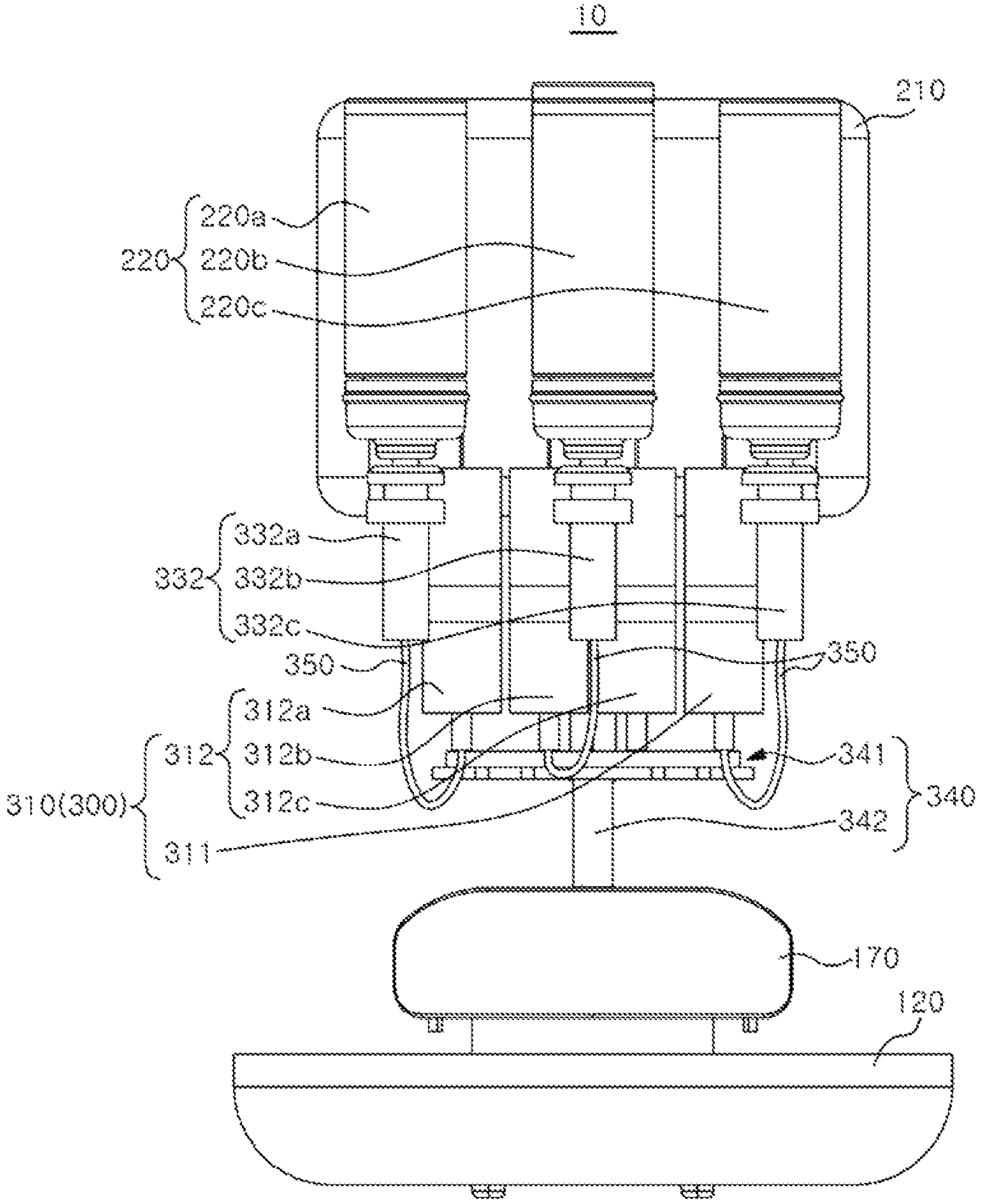
FIG. 13 is a front view illustrating a connection relationship between a fluid receiving part and a conveying part provided in the fluid processing apparatus of FIG. 1.
Figure 14:
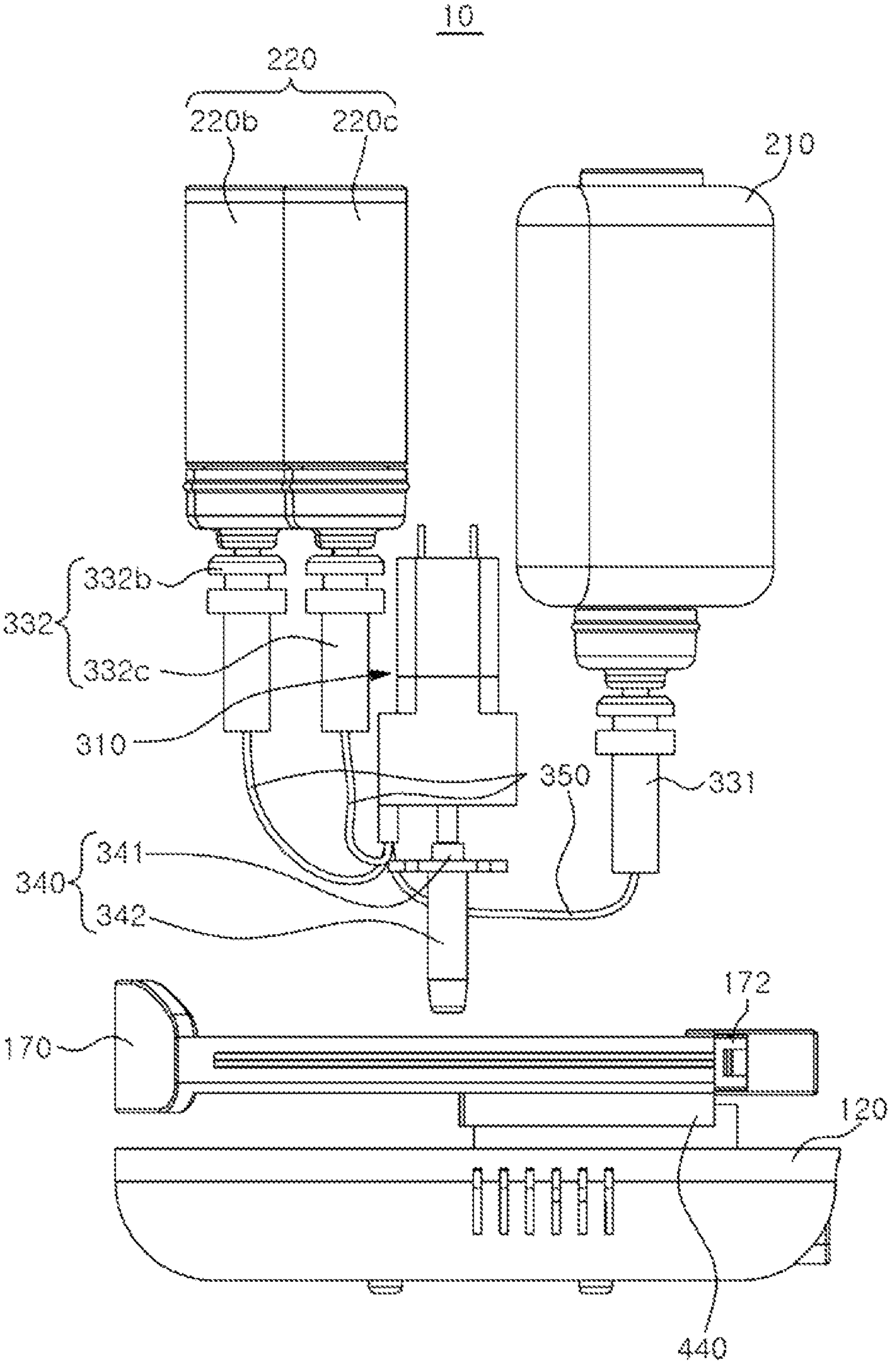
FIG. 14 is a side view illustrating a connection relationship between a fluid receiving part and a conveying part provided in the fluid processing apparatus of FIG. 1.
Figure 15:
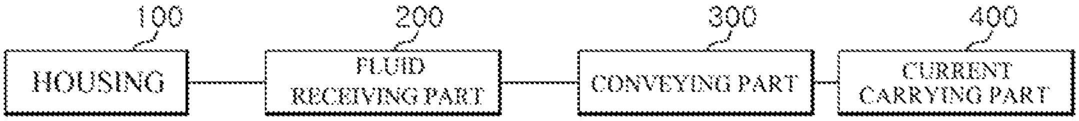
FIG. 15 is a block diagram illustrating each configuration of a fluid processing apparatus provided to perform a method of controlling a fluid processing apparatus according to an embodiment of this disclosure.
Figure 16:
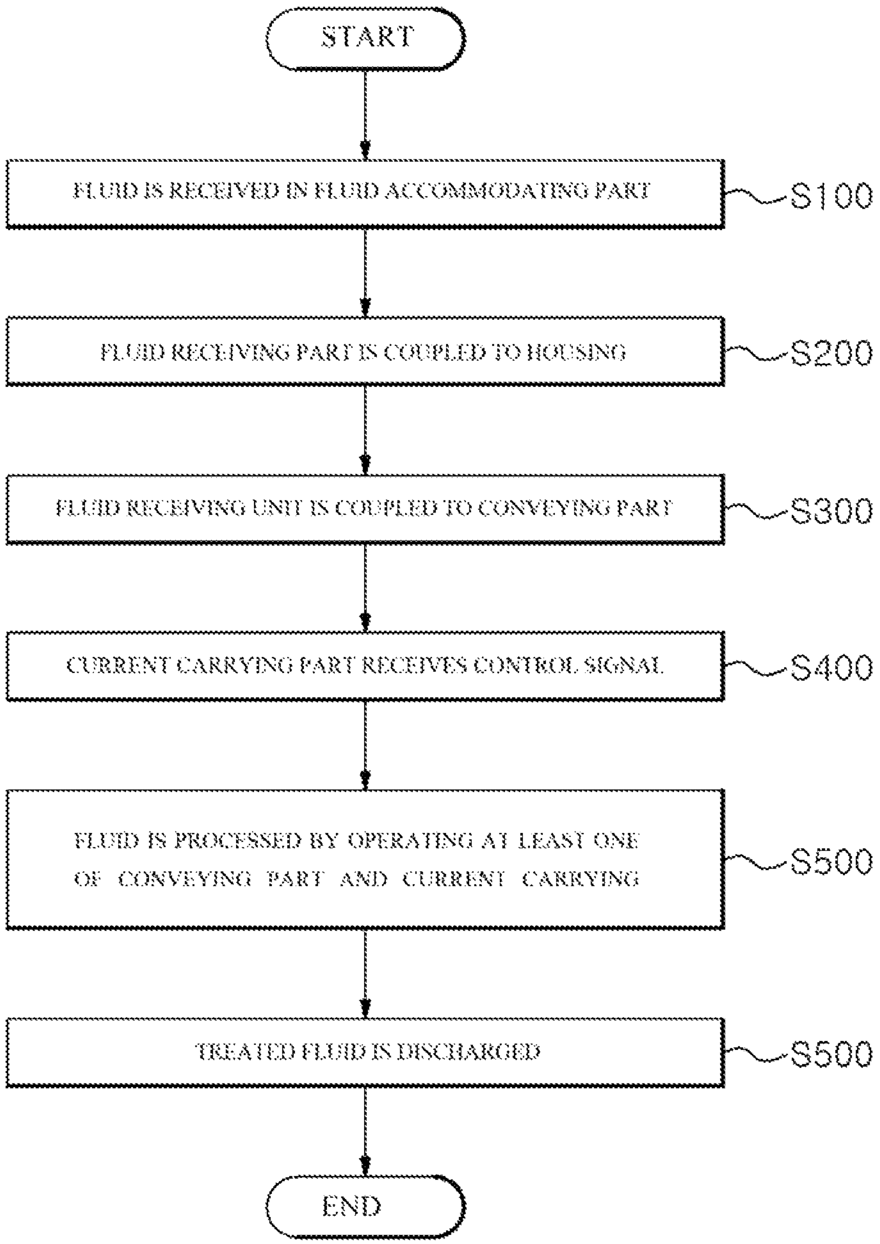
FIG. 16 is a flowchart illustrating a method of controlling a fluid processing apparatus according to an embodiment of this disclosure.
Figure 17:
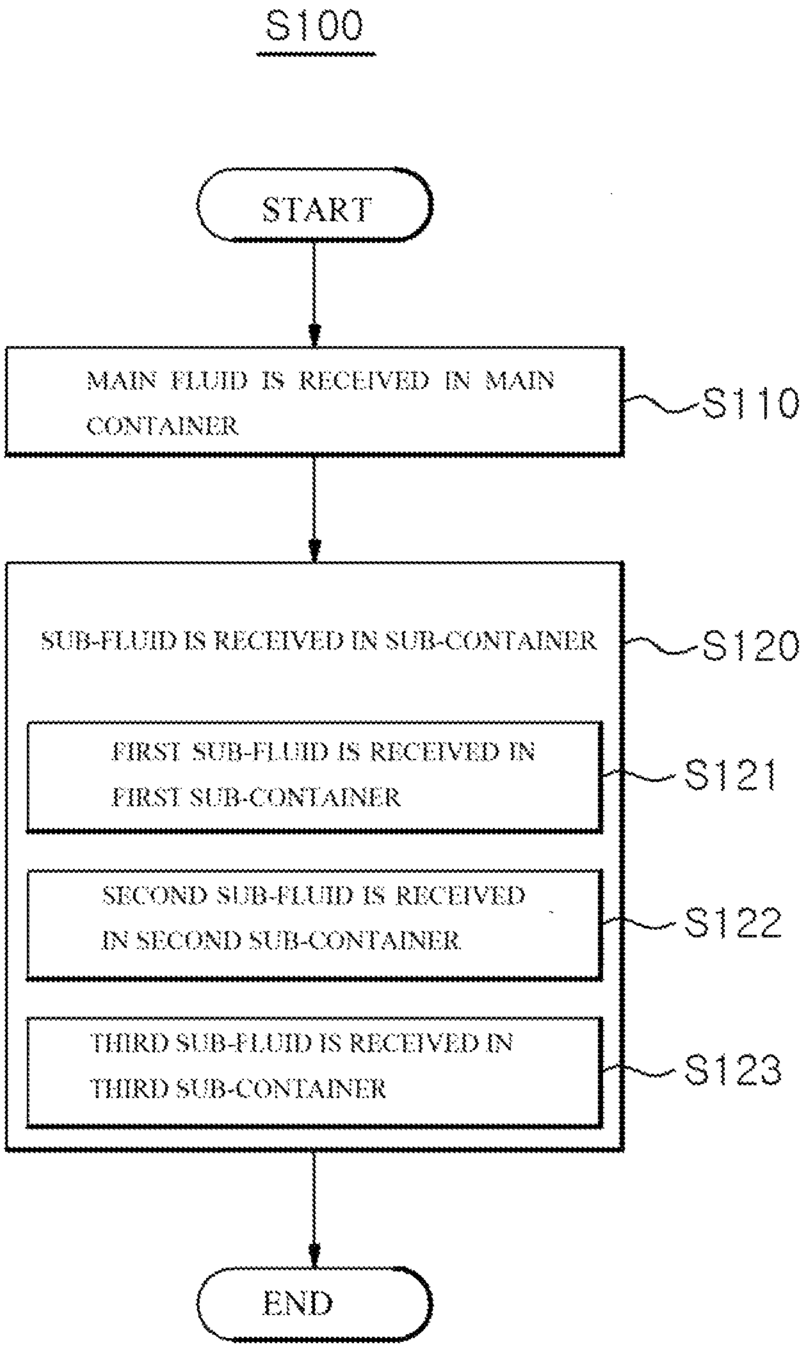
FIG. 17 is a flowchart illustrating a specific flow of step S100 of FIG. 16.
Figure 18:
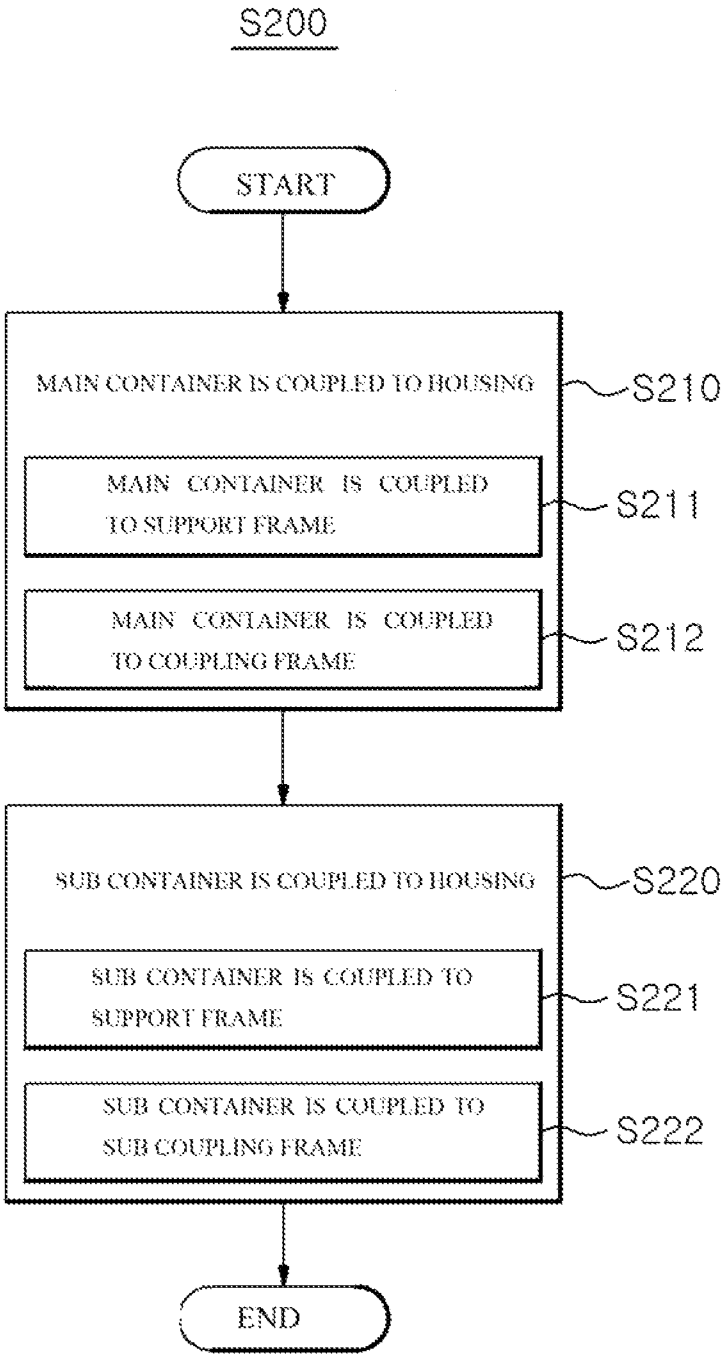
FIG. 18 is a flowchart illustrating a specific flow of step S200 of FIG. 16.
Figure 19:
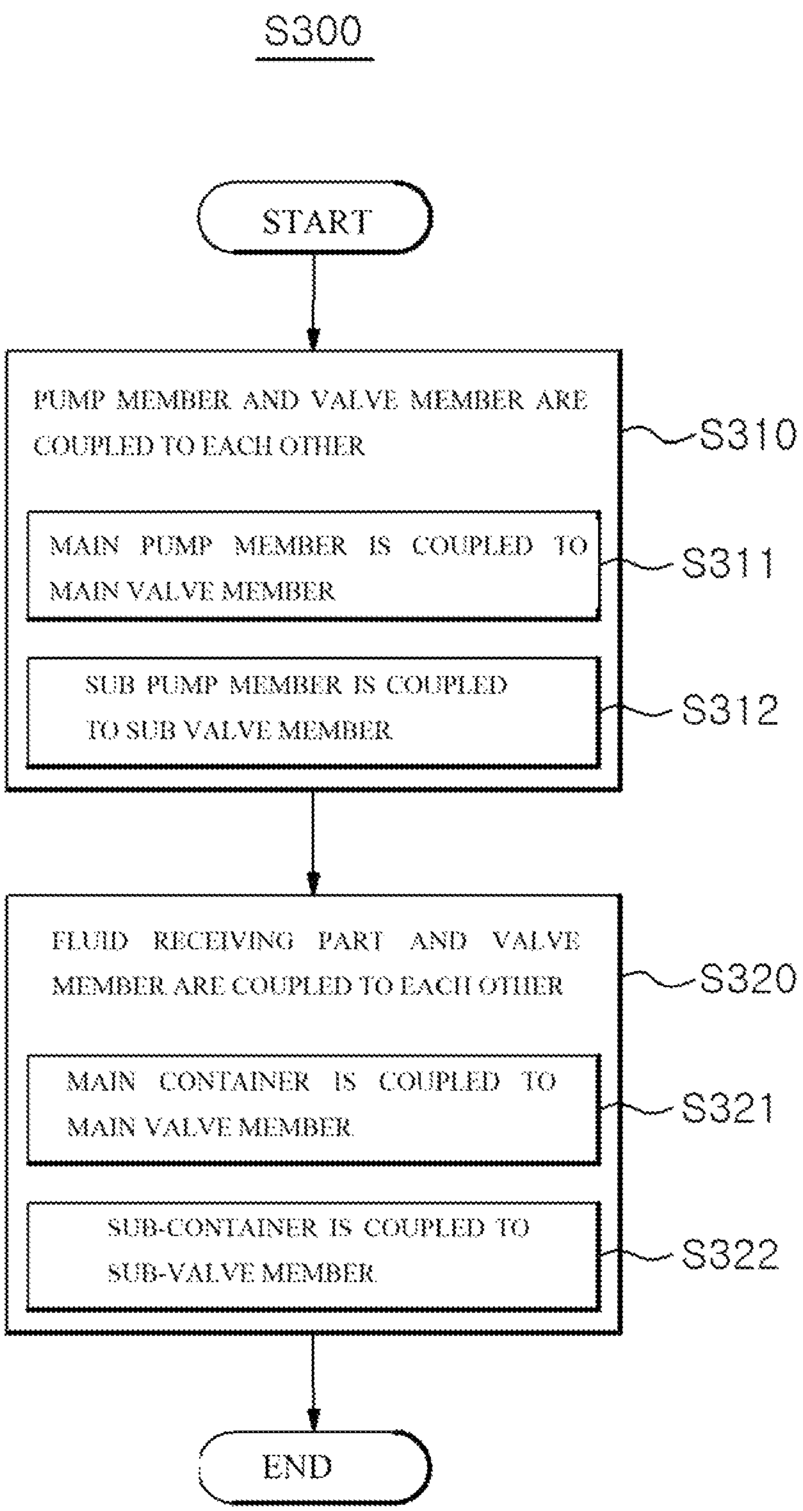
FIG. 19 is a flowchart illustrating a specific flow of step S300 of FIG. 16.
Figure 20:
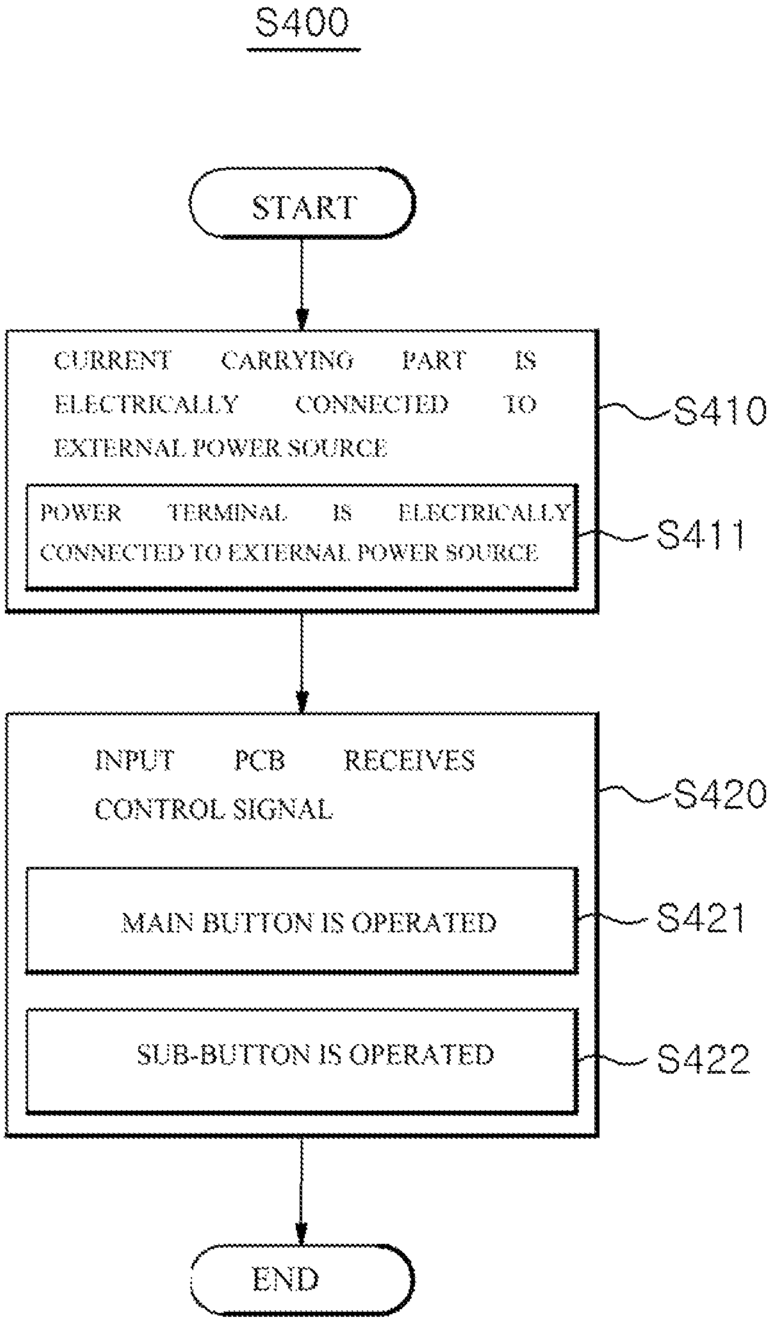
FIG. 20 is a flowchart illustrating a specific flow of step S400 of FIG. 16.
Figure 21:
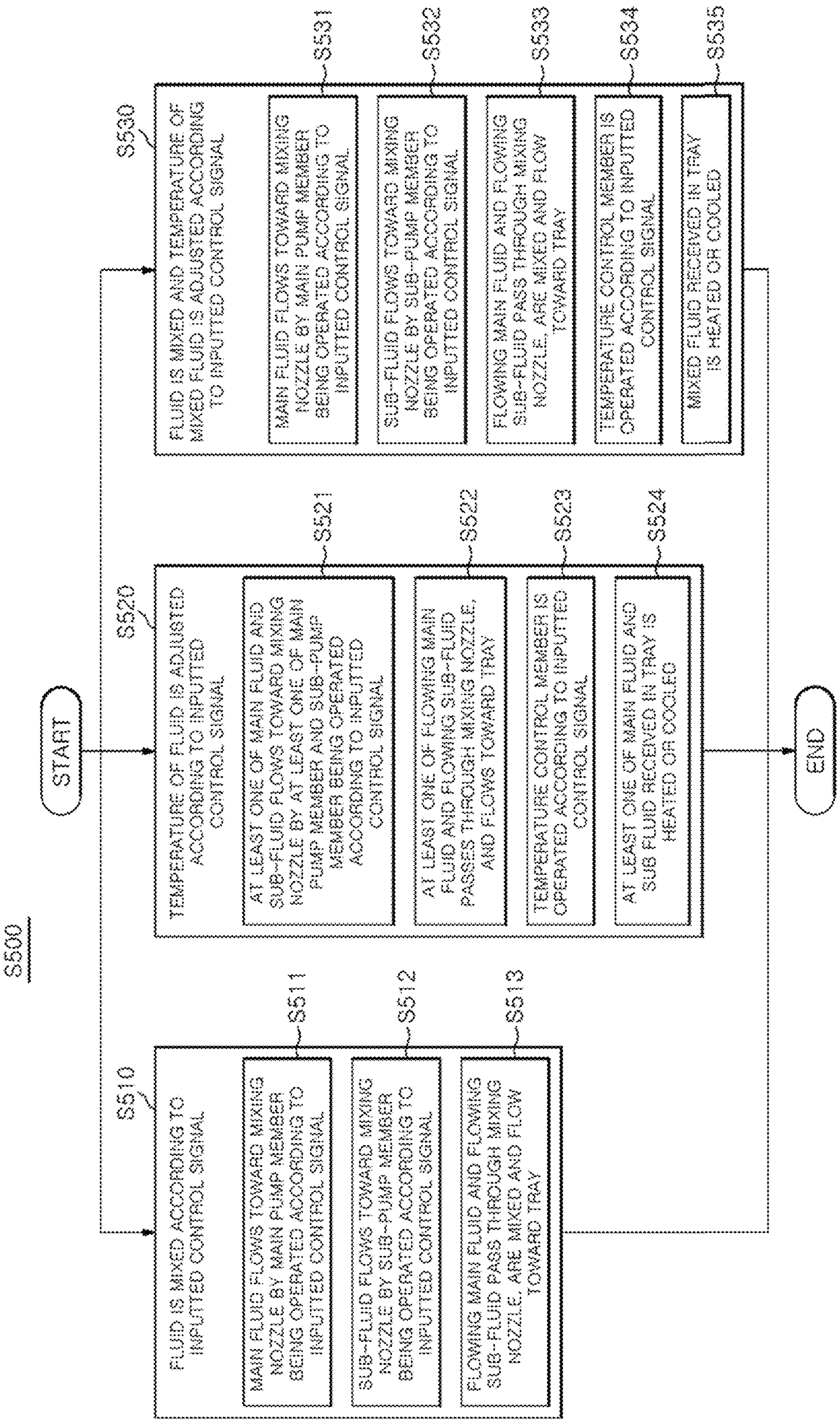
FIG. 21 is a flowchart illustrating a specific flow of step S500 of FIG. 16.
Figure 22:
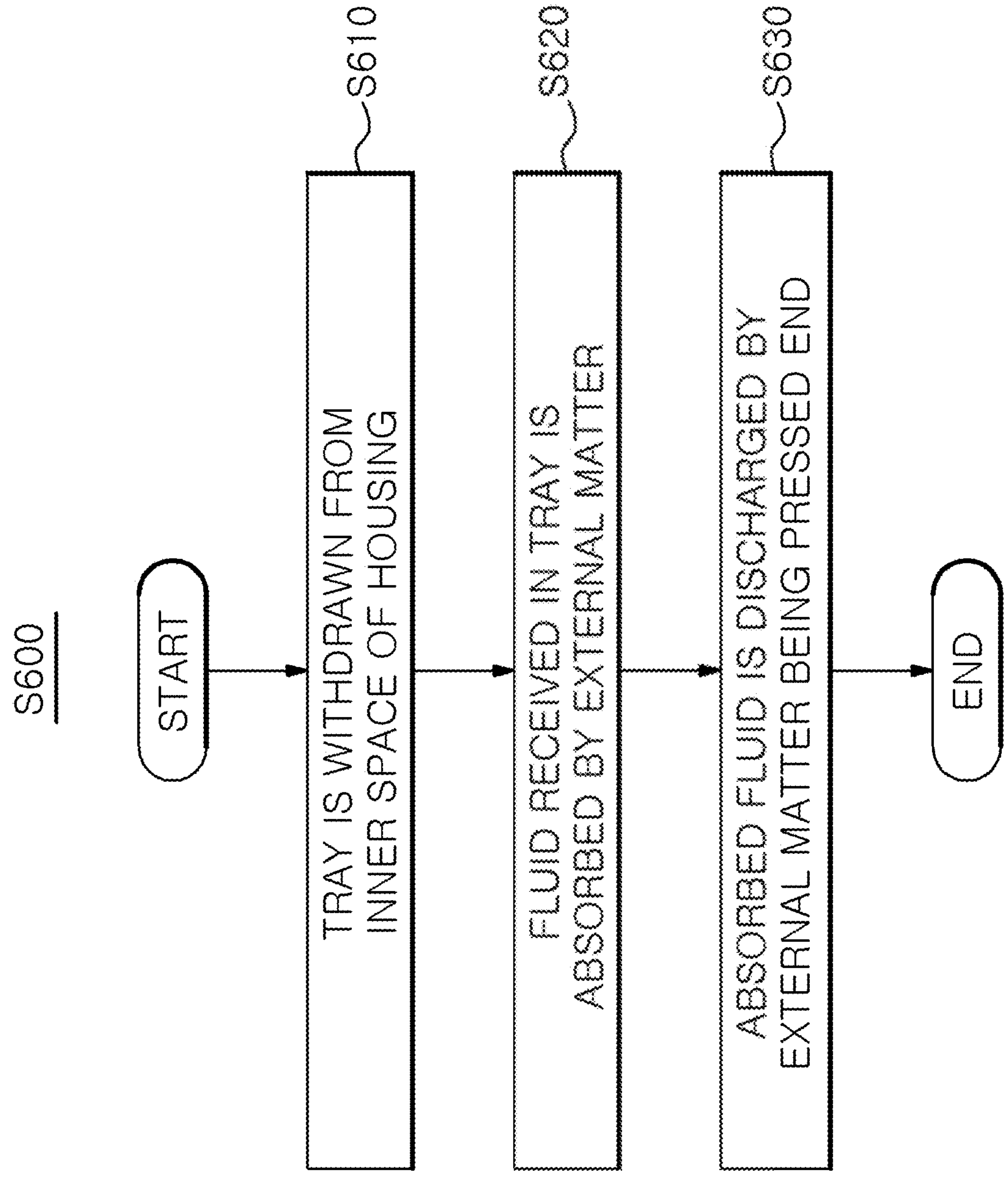
FIG. 22 is a flowchart illustrating a specific flow of step S600 of FIG. 16.

The upper portion of the main valve member 331 is coupled to a main extension portion 211 of the main container 210 accommodated in the main coupling part 161 to be in fluid communication therewith (see FIG. 11). In one embodiment, the upper portion of the main valve member 331 and the main extension portion 211 may be screwed to each other.

The main valve member 331 is coupled to the main pump member 311 to be in fluid communication therewith. Specifically, the lower side of the main valve member 331 is connected to one side of the hose member 350 to be in fluid communication therewith. The other side of the hose member 350 may be connected to the main pump member 311 to be in fluid communication therewith, so that the main valve member 331 and the main pump member 311 may communicate with each other.

The main valve member 331 may have a greater volume than the sub-valve member 332. As described above, this is because the flow amount of the main fluid is greater than the flow amount of the sub-fluid. Accordingly, the main fluid received in the main container 210 can flow smoothly.

The sub-valve member 332 connects the sub-container 220 and the sub-pump member 312 in fluid communication therebetween.

The sub-valve member 332 is coupled to the sub-container 220 to be in fluid communication therewith. Specifically, the sub-valve member 332 has its upper side accommodated in the sub-coupling part 162 of the coupling frame 160, and the remaining part thereof penetrates the coupling frame 160 and extends downward.

The upper portion of the sub-valve member 332 is coupled to a sub-extension portion 221 of the sub-container 220 accommodated in the sub-coupling part 162 to be in fluid communication therewith (see FIG. 11). In one embodiment, the upper portion of the sub-valve member 332 and the sub-extension portion 221 may be screwed to each other.

The sub-valve member 332 may have a smaller volume than the main valve member 331. This is due to the difference in the flow amount between the main fluid and the sub-fluid as described above.

As described above, the plurality of sub-containers 220 may be provided. Accordingly, the plurality of sub-valve members 332 may also be provided, and be connected to each of the plurality of sub-containers 220 to be in fluid communication therewith.

In the shown embodiment, the sub-valve member 332 includes the first sub-valve member 332*a* communicating with the first sub-container 220*a*; the second sub-valve member 332*b* communicating with the second sub-container 220*b*; and the third sub-valve member 332*c* communicating with the third sub-container 220*c*.

Each sub-valve member 332*a*, 332*b* or 332*c* is coupled to the coupling frame 160 at different locations therein. Specifically, the first sub-valve member 332*a* is accommodated in and connected to the first sub-coupling part 162*a*; the second sub-valve member 332*b* is accommodated in and connected to the second sub-coupling part 162*b*; and the third sub-valve member 332*c* is accommodated in and connected to the third sub-coupling part 162*c*.

As described above, the plurality of sub-pump members 312 may also be provided. Accordingly, each of the sub-valve members 332*a*, 332*b* and 332*c* is connected to the different sub-pump members 312 to be in fluid communication therewith.

Specifically, the first sub-valve member 332*a* communicates with the first sub-pump member 312*a* through the hose member 350. The second sub-valve member 332*b* communicates with the second sub-pump member 312*b* through the hose member 350, and the third sub-valve member 332*c* communicates with the third sub-pump member 312*c* through the hose member 350.

The main fluid or sub-fluid introduced into the pump member 310 through the valve member 330 flows toward the mixing nozzle 340.

The mixing nozzle 340 collects the main fluid or the sub-fluid received in the fluid receiving part 200 and mixes them with each other. The fluid resulting from the mixing in the mixing nozzle 340 may fall to the tray 170.

Among the components of the conveying part 300, the mixing nozzle 340 is located at the lowermost side. In other words, the pump member 310, pump housing 320, and valve member 330 of the conveying part 300 are located to face the tray 170 with the mixing nozzle 340 interposed therebetween.

The mixing nozzle 340 is connected to the pump member 310 to be in fluid communication therewith. The main fluid or sub-fluid which has passed through the pump member 310 may flow to the mixing nozzle 340. At this time, as the mixing nozzle 340 is located at the lower side of the pump member 310, the main fluid or the sub-fluid can flow smoothly to the mixing nozzle 340 by the gravity and the conveying force applied by the pump member 310.

As described above, the plurality of pump members 310 may be provided. The mixing nozzle 340 is connected to each of the plurality of pump members 310 to be in fluid communication therewith.

In the shown embodiment, the mixing nozzle 340 includes an inlet 341 and an outlet 342.

The inlet 341 is a portion through which the mixing nozzle 340 is connected to the pump member 310 to be in fluid communication therewith. The main fluid or sub-fluid which has passed through the pump member 310 may flow into the mixing nozzle 340 through the inlet 341. That is, the inlet 341 functions as a flow path for guiding the main fluid or the sub-fluid to the outlet 342.

The inlet 341 is located on one side facing the pump member 310, such as on the upper side in the shown embodiment. The inlet 341 is coupled to the lower side of the pump member 310.

As described above, the plurality of pump members 310 may be provided. In addition, in the shown embodiment, the plurality of pump members 310 are arranged side by side in the left and right direction. Accordingly, the inlet 341 also extends in the left and right directions, and is respectively coupled to the lower sides of the plurality of pump members 310. The inlet 341 preferably extends to overlap the pump members 310 located at both ends of the plurality of pump members 310 in the vertical direction.

The shape of the inlet 341 may be changed according to the manner in which the plurality of pump members 310 are arranged.

The inlet 341 communicates with the outlet 342. Specifically, a space in which the main fluid or the sub-fluid flows is formed in the inlet 341. The space in the inlet 341 communicates with the space formed inside the outlet 342. Accordingly, the main fluid or the sub-fluid flowing to the inlet 341 can flow into the space formed inside the outlet 342.

The outlet 342 mixes the main fluid or the sub-fluid introduced into the mixing nozzle 340, and discharges the mixed fluid toward the tray 170.

The outlet 342 extends between the inlet 341 and the tray 170. In the shown embodiment, the outlet 342 extends in the vertical direction, and its upper end is connected to the lower side of the inlet 341, and the lower end thereof is located to be spaced apart from the tray 170 by a predetermined distance.

The space is formed inside the outlet 342. One side of the space facing the inlet 341, such as the upper side in the shown embodiment, communicates with the inner space of the inlet 341. The other side of the space facing the tray 170, such as the lower side in the shown embodiment, is formed to be open.

In this case, the cross section of the space of the outlet 342 may be formed to become narrower toward the tray 170, that is, downward. Accordingly, the flow velocity of the main fluid or sub-fluid flowing through the space of the outlet 342 increases toward the tray 170, so that the flow of the main fluid or sub-fluid may proceed more smoothly.

Accordingly, the main fluid or sub-fluid which has flown to the inlet 341 may pass through the space of the outlet 342 and fall to the tray 170. In this case, the main fluid or the sub-fluid may flow together and be mixed in the space of the outlet 342.

Although not shown, an agitating device for mixing the main fluid or the sub-fluid may be provided in the space of the outlet 342. The introduced main fluid or sub-fluid may be more efficiently mixed and discharged by the agitating device (not shown). In an embodiment, the agitating device (not shown) may be provided as a line mixer or a static mixer.

The hose member 350 is connected to the pump member 310 and the valve member 330, respectively to be in fluid communication therebetween, and communicates the pump member 310 and the valve member 330 with each other. Specifically, the hose member 350 is coupled to one side of the valve member 330 opposite to the fluid receiving part 200, such as the lower side thereof in the shown embodiment, and to one side of the pump member 310 toward the mixing nozzle 340, such as the lower side thereof in the shown embodiment.

The hose member 350 may be formed of a flexible material. This is to reliably connect the pump member 310 and the valve member 330 to each other even when the pump member 310 is operated generating vibration. In addition, as the hose member 350 is formed of the above material, the arrangement and design freedom of the pump member 310 and the valve member 330 may be improved.

As described above, the plurality of the pump members 310 and the valve members 330 may be provided. Accordingly, a plurality of hose members 350 may also be provided, so that the plurality of pump members 310 and the plurality of valve members 330 may communicate with each other.

In the shown embodiment, four hose members 350 are provided. The four hose members 350 connect each pump member 310 and each valve member 330 with each other to be in fluid communication therebetween.

Specifically, the hose member 350 communicates with the main pump member 311 and the main valve member 331. Also, the hose member 350 communicates with each of the sub-pump members 312*a*, 312*b*, and 312*c* and each of the sub-pump members 312*a*, 312*b*, and 312*c*.

(4) Description of the Current Carrying Part 400

Referring back to FIGS. 4 to 14, the fluid processing apparatus 10 according to the shown embodiment includes the current carrying part 400.

The current carrying part 400 receives power and a control signal for operating the fluid processing apparatus 10. The inputted power and control signals are transmitted to each component of the fluid processing apparatus 10 so that each component can be operated to process the fluid.

The current carrying part 400 is electrically connected to an external power source (not shown). Power required to operate the fluid processing apparatus 10 may be delivered from the external power source. The connection may be formed by a conductive wire member (not shown) or the like.

The current carrying part 400 receives a control signal from the outside. In an embodiment, the current carrying part 400 may be pressed or rotated by a user to receive a control signal, or may receive a control signal through a wired or wireless method through a terminal such as a smart phone.

In addition, the current carrying part 400 may be operated by power and control signals, so that it can heat or cool the fluid accommodated and collected in the tray 170. A detailed description thereof will be provided later.

A portion of the current carrying part 400 is accommodated in the inner space of the housing 100. In addition, the remaining portion of the current carrying part 400 is exposed to the outside of the housing 100. The current carrying part 400 is electrically connected to an external power source (not shown) through the remaining portion. In addition, the current carrying part 400 receives a control signal from the outside through the remaining portion.

In the shown embodiment, it includes the inputted PCB 410, the output PCB 420, the power terminal 430, and the temperature control member 440.

The inputted PCB 410 receives a control signal from the outside. A user may inputted a control signal by manipulating the inputted PCB 410.

The inputted PCB 410 is partially accommodated inside the housing 100. In other words, a portion of the inputted PCB 410 is accommodated in the housing 100, and the remaining portion of the inputted PCB 410 is exposed to the outside of the housing 100.

The inputted PCB 410 is electrically connected to the pump member 310. The connection may be formed by a conductive wire member (not shown) or the like.

The inputted PCB 410 is electrically connected to the output PCB 420. Power required for the inputted PCB 410 to operate may be transmitted from the output PCB 420. The connection may be formed by a conductive wire member (not shown) or the like.

The inputted PCB 410 is electrically connected to the temperature control member 440. The inputted PCB 410 is electrically connected to the temperature control member 440.

The inputted PCB 410 is located biased toward one side of the housing 100. Specifically, the inputted PCB 410 is located adjacent to the front cover 130, and is partially exposed to the outside of the front cover 130. In the shown embodiment, the inputted PCB 410 is located biased toward the front side of the housing 100.

The inputted PCB 410 is located opposite to the output PCB 420 located on the rear side of the housing 100. In other words, the inputted PCB 410 is disposed to face the output PCB 420 with the space formed inside the housing 100 interposed therebetween.

In the shown embodiment, the inputted PCB 410 includes the main button 411, the sub-button 412, and the light emitting part 413.

The main button 411 is a part to which a control signal is inputted by the user. The main button 411 may receive various control signals required to operate the fluid processing apparatus 10. In an embodiment, the main button 411 may receive a control signal for turning on/off the power of the fluid processing apparatus 10. Alternatively, the main button 411 may receive a control signal by which the fluid processing apparatus 10 starts/stops the fluid processing process.

In the above embodiment, the main button 411 may receive a control signal related to the operation of the main pump member 311.

The main button 411 is partially exposed to the outside of the housing 100. In the shown embodiment, the main button 411 penetrates the button opening 132 and is partially exposed to the outside of the front cover 130.

The main button 411 may be manipulated by a user in various forms to receive a control signal. In the shown embodiment, the main button 411 is provided in the form of a toggle button that receives a control signal when being pressed. Alternatively, the main button 411 may be provided in the form of a dial that receives a control signal when being rotated.

In the shown embodiment, the main button 411 has a circular cross-section and has a cylindrical shape extending in the front-rear direction. The shape of the main button 411 may be changed according to the shape of the button opening 132.

In this case, the main button 411 may be formed to be greater than the sub-button 412. As described above, since the control signal applied through the main button 411 is related to the operation of the fluid processing apparatus 10, the user can intuitively recognize the function of the main button 411.

The outer surface of the main button 411, such as the front side surface thereof in the shown embodiment, may be located on the same surface as the front cover 130. In the shown embodiment, as the front cover 130 has the curved surface convexly rounded toward the front side, the outer surface of the main button 411 may be formed in a curved surface convexly rounded toward the front side. In the above embodiment, the curvature of the outer surface of the main button 411 may be the same as the curvature of the front cover 130.

Accordingly, the main button 411 does not protrude to the outside of the front cover 130, and thus the user's convenience and the aesthetic of appearance can be improved.

The sub-button 412 is a part to which a control signal is inputted by the user. The sub-button 412 may receive various control signals related to the manner in which the fluid processing apparatus 10 processes the fluid. In an embodiment, the sub-button 412 may receive a control signal for operating one or more of the pump members 310. Also, the sub-button 412 may receive a control signal for operating the temperature control member 440.

The sub-button 412 is located adjacent to the main button 411. In the shown embodiment, the sub-button 412 is located above the main button 411, but its position may be changed.

The sub-button 412 is accommodated in the housing 100. That is, the sub-button 412 is not exposed to the outside of the housing 100. Accordingly, an intermediate body for transmitting the control signal applied by the user to the sub-button 412 is required, and for this purpose, the selection button 131 is provided.

The sub-button 412 is located adjacent to the selection button 131. When the selection button 131 is pressed by a user, the sub-button 412 is pressed by the selection button 131 to receive a control signal.

In the shown embodiment, the sub-button 412 is provided in the form of a toggle button to which, when it being pressed by the selection button 131, a control signal is applied. Alternatively, the sub-button 412 is provided in the form of a dial to which, when it being rotated, a control signal is applied. In the above embodiment, the sub-button 412 may be coupled to the selection button 131 so that it can be rotated together with the selection button 131.

The plurality of sub-buttons 412 may be provided. The plurality of sub-buttons 412 may be spaced apart from each other in the width direction of the housing 100, and may be arranged side by side in the left-right direction in the shown embodiment.

The plurality of sub-buttons 412 correspond to the plurality of pump members 310, specifically, the plurality of sub-pump members 312, respectively, and can be configured to receive a control signal for controlling the operation of each sub-pump member 312. Alternatively, a plurality of programs preset to operate the main pump member 311 and the sub-pump member 312 may be assigned to the plurality of sub-buttons 412, respectively.

In the shown embodiment, three sub-buttons 412 are provided, including the first sub-button 412*a*, the second sub-button 412*b*, and the third sub-button 412*c*. The number of sub-buttons 412 may be changed according to the number of sub-pump members 312.

The first sub-button 412*a*, the second sub-button 412*b*, and the third sub-button 412*c* may be located adjacent to the first selection button 131*a*, the second selection button 131*b* and the third selection button 131*c*, respectively.

The sub-button 412 is electrically connected to the light emitting part 413.

The light emitting part 413 emits light as a control signal is inputted to the sub-button 412, so that the user can recognize that the sub-button 412 is being manipulated.

The light emitting part 413 is partially exposed to the outside of the housing 100. In the shown embodiment, the light emitting part 413 is partially exposed to the outside of the front cover 130.

The light emitting part 413 is located adjacent to the sub-button 412. In the shown embodiment, the light emitting part 413 is located above the sub-button 412.

The light emitting part 413 is electrically connected to the sub-button 412. When a control signal is applied to the sub-button 412, the light emitting part 413 may light up.

The light emitting part 413 may include a plurality of lamps (no reference number). The plurality of lamps may be respectively located adjacent to the plurality of sub-buttons 412. In the shown embodiment, there are provided three lamps which are respectively located adjacent to the three sub-buttons 412. The number of lamps may be changed according to the number of sub-buttons 412.

The output PCB 420 processes power applied from an external power source. In addition, the output PCB 420 delivers the processed power to each component of the fluid processing apparatus 10, for example, the pump member 310 and the inputted PCB 410. Accordingly, the fluid processing apparatus 10 may be operated according to a user's manipulation.

The output PCB 420 is accommodated in the housing 100. In addition, the output PCB 420 is located biased to the other side of the housing 100. Specifically, the output PCB 420 is located adjacent to the rear cover 140.

The output PCB 420 is located opposite to the inputted PCB 410 located on the front side of the housing 100. In other words, the output PCB 420 is disposed to face the inputted PCB 410 with the space formed inside the housing 100 interposed therebetween.

The output PCB 420 may be fixed to the guide frame 180. In the shown embodiment, the lower side of the output PCB 420 is inserted and coupled to the guide frame 180.

The output PCB 420 is electrically connected to the power terminal 430. Power applied from an external power source may be delivered to the output PCB 420 through the power terminal 430.

The output PCB 420 is electrically connected to the pump member 310. Power required to operate the pump member 310 may be delivered from the output PCB 420. The connection may be formed by a conductive wire member (not shown) or the like.

The output PCB 420 is electrically connected to the inputted PCB 410. Power required to operate the inputted PCB 410 may be delivered from the output PCB 420.

The output PCB 420 is electrically connected to the temperature control member 440. Power required to operate the temperature control member 440 may be delivered from the output PCB 420.

The output PCB 420 is electrically connected to the power terminal 430.

The power terminal 430 is a part through which the fluid processing apparatus 10 is electrically connected to an external power source. Power required to operate the fluid processing apparatus 10 may be delivered through the power terminal 430. The connection may be formed by a conductive wire member (not shown) or the like.

The power terminal 430 may be provided in any form which enables it to being electrically connected to an external power source. In the shown embodiment, the power terminal 430 is provided in the form of a connector terminal, but, alternatively, the power terminal 430 may be provided in the form of a pogo pin.

The power terminal 430 is electrically connected to the pump member 310, the inputted PCB 410, the output PCB 420, and the temperature control member 440. The connection may be formed in a direct or indirect form.

The temperature control member 440 heats or cools the fluid received in the tray 170 to generate a fluid having a temperature desired by a user. At this time, it will be understood that the fluid accommodated in the tray 170 is a mixed fluid resulting from the mixing of the main fluid and at least one of the sub-fluids.

The temperature control member 440 is electrically connected to the inputted PCB 410, the output PCB 420, and the power terminal 430. A control signal and power required to operate the temperature control member 440 may be delivered from the inputted PCB 410, the output PCB 420, and the power terminal 430. The connection may be formed by a conductive wire member (not shown) or the like.

The temperature control member 440 may be provided in any form which enables it to heat or cool other members when it being operated according to the supplied power and control signals. In an embodiment, the temperature control member 440 may be provided with a thermoelectric element such as a Peltier element.

The temperature control member 440 is located on one side of the tray 170. In the shown embodiment, the temperature control member 440 is located below the tray 170. In other words, the temperature control member 440 is disposed to face the valve member 330 with the tray 170 interposed therebetween.

The temperature control member 440 may be in contact with the tray 170. In the shown embodiment, the upper surface of the temperature control member 440 is in contact with the lower surface of the tray 170.

The temperature control member 440 may be fixed to the guide frame 180. In the shown embodiment, the temperature control member 440 is fixed to the lower side of the guide frame 180.

3. Description of the Control Method of the Fluid Processing Apparatus 10 According to an Embodiment of this Disclosure The fluid processing apparatus 10 according to an embodiment of this disclosure may process the main fluid or the sub-fluid into a user's desired form through the above-described configuration, and provide it to the user.

Accordingly, the user can conveniently and hygienically process the fluid without manually processing the fluid in order to generate a desired fluid.

Hereinafter, a method of controlling the fluid processing apparatus 10 according to an exemplary embodiment of this disclosure will be described in detail with reference to FIGS. 15 to 22.

In the shown embodiment, the control method of the fluid processing apparatus 10 includes receiving a fluid in the fluid receiving part 200 (S100), coupling the fluid receiving part 200 to the housing 100 (S200), coupling the fluid receiving part 200 to the conveying part 300 (S300), receiving a control signal in the current carrying part 400 (S400), processing the fluid by operating at least one of the conveying part 300 and the current carrying part 400 according to the inputted control signal (S500), and discharging the treated fluid (S600).

Also, although not shown, washing the fluid processing apparatus 10 after the discharging the processed fluid (S600) may be further included. In the additional step, the main fluid received in the main container 210 may be additionally discharged by the conveying part 300 to remove the sub-fluids remaining in the conveying part 300. In the embodiment in which the additional step is included, since the amount of the sub-fluid remaining in the conveying part 300 is minimized, the mixing ratio between the main fluid and the sub-fluid can be more accurately matched.

(1) Description of the Step (S100) in which the Fluid is Received in the Fluid Receiving Part 200

This is a step in which the fluid desired by the user is received in the fluid receiving part 200. The fluid received in the fluid receiving part 200 may be processed in various forms and provided to the user as the fluid processing apparatus 10 is operated. Hereinafter, this step (S100) will be described in detail with reference to FIG. 17.

First, the main fluid is received in the main container 210 (S110). As described above, the main fluid functions as a solvent of the fluid desired by the user. Accordingly, a greater amount of the main fluid is required compared to the sub-fluid, and for this purpose, the volume of the main container 210 is formed to be greater than that of the sub-container 220 as described above.

In addition, since the main fluid functions as a base of the fluid desired by the user, the user will generally select the main fluid first than the sub-fluid.

Next, the sub-fluid is received in the sub-container 220 (S120). As described above, the sub-fluid functions as a solute of the fluid desired by the user. In addition, the plurality of sub-containers 220 may be provided to receive different sub-fluids.

Accordingly, this step (S120) may include receiving a different sub-fluid in at least one of the respective sub-containers 220*a*, 220*b* and 220*c*.

That is, in the shown embodiment, the present step (S120) may include at least one of receiving the first sub-fluid in the first sub-container 220*a* (S121), receiving the second sub-fluid in the second sub-container 220*b* (S122), and receiving the third sub-fluid in the third sub-container 220*c* (S123).

(2) Description of the Step (S200) in which the Fluid Receiving Part 200 is Coupled to the Housing 100

It is a step (S200) in which the fluid receiving part 200 in which the fluid is received is coupled to the housing 100, specifically, to the support frame 150 and the coupling frame 160. The fluid receiving part 200 may be removably coupled to the support frame 150 and the coupling frame 160. Hereinafter, this step (S200) will be described in detail with reference to FIG. 18.

First, the main container 210 is coupled to the housing 100 (S210). At this time, the main container 210 is penetratingly coupled to the main support part 151 of the support frame 150 (S211), and then is partially inserted and coupled to the main coupling part 161 of the coupling frame 160 (S212).

In addition, the sub-container 220 is coupled to the housing 100 (S220). At this time, the sub-container 220 is penetratingly coupled to the sub-support part 152 of the support frame 150 (S221), and then is partially inserted and coupled to the sub-coupling part 162 of the coupling frame 160 (S222).

As described above, the plurality of sub-containers 220 may be provided. In this case, it will be understood that the plurality of sub-containers 220 are respectively coupled to the plurality of main support parts 151 and sub-support parts 152.

Meanwhile, the order of the step (S210) in which the main container 210 is coupled to the housing 100 and the step (S220) in which the sub-container 220 is coupled to the housing 100 may be changed. That is, after the sub-container 220 is first coupled to the housing 100, the main container 210 may be coupled to the housing 100.

(3) Description of the Step (S300) in which the Fluid Receiving Part 200 is Coupled to the Conveying Part 300

The fluid receiving part 200 coupled to the housing 100 is coupled to the conveying part 300, and communicates with the conveying part 300 (S300). Hereinafter, this step (S300) will be described in detail with reference to FIG. 19.

First, the pump member 310 and valve member 330 of the conveying part 300 are coupled to each other to communicate with each other (S310). In this regard, as described above, the plurality of the pump members 310 and the valve members 330 may be provided.

Accordingly, the main pump member 311 is coupled to the main valve member 331 to be in fluid communication therewith (S311). Also, the sub-pump member 312 is coupled to the sub-valve member 332 to be in fluid communication therewith (S312).

As described above, the plurality of the sub-pump members 312 and the sub-valve members 332 may be provided. Accordingly, this step (S312) may include coupling the plurality of sub-pump members 312 and the plurality of sub-valve members 332 to be in fluid communication therebetween.

Next, the fluid receiving part 200 and the valve member 330 are coupled to each other to be in fluid communication therebetween (S320). In this case, the plurality of fluid receiving parts 200 may also be provided.

Accordingly, the main container 210 is coupled to the main valve member 331 to be in fluid communication therewith (S321). In addition, the sub-container 220 is coupled to the sub-valve member 332 to be in fluid communication therewith (S322).

Accordingly, the fluid receiving part 200 and the conveying part 300 may communicate with each other.

Meanwhile, this step (S320) may be performed simultaneously with the step (S200) in which the fluid receiving part 200 is coupled to the housing 100. That is, as the fluid receiving part 200 is coupled to the housing 100 and partially accommodated in the coupling frame 160, the lower side of the fluid receiving part 200 may be coupled to the conveying part 300 to be in fluid communication therewith.

(4) Description of the Step (S400) in which the Current Carrying Part 400 Receives a Control Signal It is a step (S400) in which the fluid processing apparatus 10 receives power and control signals from an external power source and a user. Hereinafter, this step (S400) will be described in detail with reference to FIG. 20.

First, the current carrying part 400 is electrically connected to an external power source (not shown) (S410). As described above, the connection may be formed by a conductive wire member or the like.

Specifically, the power terminal 430 of the current carrying part 400 is electrically connected to an external power source (not shown) (S411). In the above-described embodiment, the power terminal 430 may be provided in the form of a connector terminal, so that an electrically connected state may be formed by coupling the connector member.

Next, the inputted PCB 410 receives a control signal from the user (S420).

In this case, the main button 411 receiving a control signal related to the operation of the fluid processing apparatus 10 is first operated to receive the control signal (S421). Next, the sub-button 412 to which a control signal related to the processing method of the fluid is applied is operated to receive the control signal (S422).

The applied control signal is transmitted to the conveying part 300 and the current carrying part 400, and is utilized to process the fluid according to the user's wishes.

(5) Description of the Step (S500) in which at Least One of the Conveying Part 300 and the Current Carrying Part 400 is Operated to Process the Fluid According to the Inputted Control Signal According to the control signal inputted by the user, at least one of the conveying part 300 and the current carrying part 400 is operated to process the fluid (S500). Hereinafter, this step will be described in detail with reference to FIG. 21.

As described above, the temperature control member 440 of the current carrying part 400 is operated when a user inputs a control signal related to the temperature of the fluid. On the other hand, the conveying part 300 is always operated when the user wants to process the fluid. Accordingly, it will be understood that this step is a step in which the fluid processing apparatus 10 is controlled so that the conveying part 300 is always operated, but the temperature control member 440 of the current carrying part 400 is additionally operated or not operated.

First, the step (S510) of mixing the fluid according to the inputted control signal will be described.

According to the control signal inputted to the inputted PCB 410, the main pump member 311 of the conveying part 300 is operated. Accordingly, the main valve member 331 is opened, so that the main container 210 and the main pump member 311 communicate with each other. As a result, the main fluid received in the main container 210 passes through the main pump member 311 and flows toward the mixing nozzle 340 (S511).

Further, according to the control signal inputted to the inputted PCB 410, the sub-pump member 312 of the conveying part 300 is operated. Accordingly, the sub-valve member 332 is opened so that the sub-container 220 and the sub-pump member 312 communicate with each other. As a result, the sub-fluid received in the sub-container 220 also passes through the sub-pump member 312 and flows toward the mixing nozzle 340 (S512).

It will be understood that, at this time, the sub-container 220, the sub-pump member 312, and the sub-valve member 332 are provided plurally, and that the plurality of sub-pump members 312 may be operated independently of each other according to the inputted control signal.

The main fluid and the sub-fluid flowing to the mixing nozzle 340 pass through the mixing nozzle 340, and are mixed and flow toward the tray 170 (S513). As described above, the mixing nozzle 340 is provided with an agitating member (not shown), so that the mixing of the main fluid and the sub-fluid can be proceeded more efficiently.

As described above, the fluid processing apparatus 10 according to an embodiment of this disclosure may process any one or more of the main fluid and the sub-fluid, and discharge the processed fluid. Accordingly, it will be understood that any one of the above-described steps may be omitted or the order thereof may be changed.

Next, a step (S520) of adjusting the temperature of the fluid according to the inputted control signal will be described. This step (S520) relates to an embodiment in which the main fluid or the sub-fluid is discharged alone, and the temperature thereof is controlled.

According to the control signal inputted to the inputted PCB 410, at least one of the main pump member 311 and the sub-pump member 312 is operated. Accordingly, at least one of the main fluid and the sub-fluid received in the fluid receiving part 200 communicating with the operated pump member 310 flows toward the mixing nozzle 340 (S521).

At least one of the main fluid and the sub-fluid flowing toward the mixing nozzle 340 is mixed with each other when passing through the mixing nozzle 340. The mixed fluid flows toward the tray 170 (S522).

According to the control signal inputted to the inputted PCB 410, the temperature control member 440 is operated (S523). At this time, the temperature control member 440 may be in contact with the tray 170 to heat or cool the fluid received in the fall space 171 of the tray 170, that is, any one or more of the main fluid and the sub-fluid (S524).

Next, a step (S530) of mixing the fluid and adjusting the temperature of the mixed fluid according to the inputted control signal will be described.

According to the control signal inputted to the inputted PCB 410, the main pump member 311 of the conveying part 300 is operated. Accordingly, the main valve member 331 is opened, so that the main container 210 and the main pump member 311 communicate with each other. As a result, the main fluid received in the main container 210 passes through the main pump member 311 and flows toward the mixing nozzle 340 (S531).

Further, according to the control signal inputted to the inputted PCB 410, the sub-pump member 312 of the conveying part 300 is operated. Accordingly, the sub-valve member 332 is opened so that the sub-container 220 and the sub-pump member 312 communicate with each other. As a result, the sub-fluid received in the sub-container 220 also passes through the sub-pump member 312 and flows toward the mixing nozzle 340 (S532).

The main fluid and the sub-fluid flowing to the mixing nozzle 340 pass through the mixing nozzle 340, and are mixed and flow toward the tray 170 (S533). As described above, the mixing nozzle 340 is provided with an agitating member (not shown), so that the mixing of the main fluid and the sub-fluid can be proceeded more efficiently.

According to the control signal inputted to the inputted PCB 410, the temperature control member 440 is operated (S534). At this time, the temperature control member 440 is in contact with the tray 170, the fluid received in the fall space 171 of the tray 170, that is, the mixed fluid may be heated or cooled (S535).

Although not shown, a process in which the main pump member 311 is operated and a certain amount of the main fluid flows may be added to any one or more of the steps before and after the step S500.

That is, as this step S500 is performed, there is a concern that a portion of the main fluid or sub-fluid flowing along the conveying part 300 may remain in the conveying part 300. In particular, when the main fluid or the sub-fluid remains in the mixing nozzle 340 in which the main fluid and the sub-fluid are mixed with each other, it is difficult to mix fluids according to amounts desired by the user.

Therefore, by performing the above step of additionally flowing the main fluid before and after the fluid processing process, it is possible to prevent the main fluid or the sub-fluid from being remained in the conveying part 300.

(6) Description of the Step (S600) in which the Processed Fluid is Discharged According to the control signal inputted by the user, the mixed or heated fluid is discharged to the outside of the fluid processing apparatus 10 and provided to the user (S610). Hereinafter, this step will be described in detail with reference to FIG. 22.

Through the above-described process, the processed fluid is collected or received in the fall space 171 of the tray 170. That is, the fluid received in the fall space 171 is in a state of being mixed, and heated or cooled according to the user's selection.

First, the tray 170 is withdrawn from the inner space of the housing 100 (S610). The process may be performed by the user pressing or, conversely, pulling the tray 170 with an external force. By the process, the fall space 171 of the tray 170 and the fluid received in the fall space 171 are exposed to the outside.

Next, the fluid received in the fall space 171 of the tray 170 is absorbed by an external matter (S620). The user may scatter or apply the absorbed fluid on his or her skin by pressing the external matter.

In this case, the external matter may be provided in any form, such as a sponge, puff, cotton, or the like, which enables it to absorb the fluid, and discharge the absorbed fluid by being pressed.

In the above description, it was assumed that a separate impregnation member, such as cotton, puff or the like, is not provided in the tray 170, but alternatively, the impregnation member may be previously provided in the fall space 171 of the tray 170. In the above embodiment, it will be understood that step S620 may be performed at step S500.

While the preferred embodiments of this disclosure have been referred to and described above, those of ordinary skill in the art can appreciate that it will be understood that various modifications and variations of this disclosure can be made without departing from the spirit and scope of this disclosure as set forth in the claims below.

What is claimed is:

1. A fluid processing apparatus comprising:
- a housing with a space formed therein;
- a fluid receiving part removably coupled to the housing and receiving a fluid therein;
- a conveying part accommodated in the space of the housing and coupled to the fluid receiving part to be in fluid communication therewith;
- a tray located below the conveying part to be withdrawable to outside of the housing, and in which the fluid discharged through the conveying part is collected;
- a temperature control member accommodated in the space of the housing and located to be in contact with a lower surface of the tray to heat or cool the fluid collected in the tray; and
- a guide frame located at a lower side of the space of the housing and accommodating the withdrawable tray,
- wherein the conveying part includes:
  - a valve member connected to the fluid receiving part,
  - a pump member coupled to the valve member and providing a conveying force to the fluid; and
  - a mixing nozzle which is in communication with the pump member, and into which the fluid flows after having passed through the pump member,
- wherein the fluid receiving part includes a plurality of containers receiving different fluids,
- wherein the valve member includes a plurality of valve members which are removably coupled to the plurality of containers, respectively, to be in fluid communication therewith,
- wherein the pump member includes a plurality of pump members which are coupled to the valve members, respectively, to be in fluid communication therewith,
- wherein the valve member permits or blocks communication between the fluid receiving part and the pump member depending on whether or not the pump member operates, and
- wherein the temperature control member is fixed to the guide frame.

2. The fluid processing apparatus of claim 1, wherein the fluid includes:
- a main fluid; and
- a plurality of sub-fluids provided in a smaller volume compared to the main fluid, and
- wherein the fluid receiving part includes:
- a main container receiving the main fluid, and coupled to any one valve member of the plurality of valve members to be in fluid communication therewith; and
- a plurality of sub-containers receiving the plurality of sub-fluids, respectively, and coupled to the plurality of valve members except said any one valve member, respectively to be in fluid communication therewith.

3. The fluid processing apparatus of claim 1, wherein the mixing nozzle includes:
- an inlet which communicates with each of the plurality of pump members, and through which the fluid is introduced; and
- a single outlet communicating with the inlet and discharging the introduced fluid.

4. The fluid processing apparatus of claim 1, wherein the temperature control member is provided with a thermoelectric element.

* * * * *